(12) United States Patent
Yang et al.

(10) Patent No.: US 12,552,715 B2
(45) Date of Patent: Feb. 17, 2026

(54) PLATE-LIKE ALUMINA PARTICLE AND METHOD FOR MANUFACTURING PLATE-LIKE ALUMINA PARTICLE

(71) Applicant: DIC Corporation, Tokyo (JP)

(72) Inventors: Shaowei Yang, Shandong (CN); Masamichi Hayashi, Chiba (JP); Hironobu Oki, Chiba (JP); Taro Morimitsu, Ibaraki (JP); Jianjun Yuan, Chiba (JP); Yasuto Murata, Chiba (JP); Cheng Liu, Shandong (CN); Wei Zhao, Shandong (CN)

(73) Assignee: DIC Corporation, Tokyo (JP)

( * ) Notice: Subject to any disclaimer, the term of this patent is extended or adjusted under 35 U.S.C. 154(b) by 989 days.

(21) Appl. No.: 17/766,712

(22) PCT Filed: Oct. 9, 2019

(86) PCT No.: PCT/CN2019/110133
§ 371 (c)(1),
(2) Date: Apr. 5, 2022

(87) PCT Pub. No.: WO2021/068128
PCT Pub. Date: Apr. 15, 2021

(65) Prior Publication Data
US 2023/0097772 A1    Mar. 30, 2023

(51) Int. Cl.
*C04B 35/10* (2006.01)
*C04B 35/117* (2006.01)
(Continued)

(52) U.S. Cl.
CPC ............ *C04B 35/117* (2013.01); *C04B 35/64* (2013.01); *C30B 29/20* (2013.01); *C30B 29/22* (2013.01);
(Continued)

(58) Field of Classification Search
CPC ......... C09C 1/0081; C09C 1/40; C09C 1/407; C01P 2002/52; C01P 2002/54;
(Continued)

(56) References Cited

U.S. PATENT DOCUMENTS

2006/0150864 A1\* 7/2006 Hashizume .......... C09D 11/037
106/400
2019/0185675 A1\* 6/2019 Yuan ..................... C09C 1/0018

FOREIGN PATENT DOCUMENTS

CN    110182834 A    8/2019
CN    113329972 A  \*  8/2021   ................ C01F 7/30
(Continued)

OTHER PUBLICATIONS

Translation of JPH-07331110 (Year: 2000).\*
(Continued)

*Primary Examiner* — Hoa (Holly) Le
(74) *Attorney, Agent, or Firm* — Rimon P.C.

(57) ABSTRACT

A plate-like alumina particle containing a coloring component is provided. A plate-like alumina particle containing molybdenum, silicon, and a coloring component. A method for manufacturing the plate-like alumina particle, the method including the steps of mixing an aluminum compound containing an aluminum element, a molybdenum compound containing a molybdenum element, silicon or a silicon compound, and a coloring component so as to produce a mixture and calcining the resulting mixture.

20 Claims, 4 Drawing Sheets

EXAMPLE 1

(51) Int. Cl.
*C04B 35/64* (2006.01)
*C30B 29/20* (2006.01)
*C30B 29/22* (2006.01)

(52) U.S. Cl.
CPC ............ *C04B 2235/3217* (2013.01); *C04B 2235/3225* (2013.01); *C04B 2235/3232* (2013.01); *C04B 2235/3241* (2013.01); *C04B 2235/3256* (2013.01); *C04B 2235/3272* (2013.01); *C04B 2235/3275* (2013.01); *C04B 2235/3279* (2013.01); *C04B 2235/3418* (2013.01); *C04B 2235/442* (2013.01); *C04B 2235/785* (2013.01); *C04B 2235/9661* (2013.01)

(58) Field of Classification Search
CPC ............ C01P 2002/60; C01P 2002/72; C01P 2002/84; C01P 2002/85; C01P 2004/02; C01P 2004/20; C01P 2004/54; C01P 2004/61; C01P 2004/62; C01P 2004/64; C01P 2006/80; C04B 35/64; C04B 2235/3241; C04B 2235/3256; C04B 2235/3418; C04B 2235/549; C04B 2235/9661

See application file for complete search history.

(56) References Cited

FOREIGN PATENT DOCUMENTS

| | | |
|---|---|---|
| JP | 01-119557 A | 5/1989 |
| JP | H07-331110 A | 12/1995 |
| JP | 2014-218425 A | 11/2014 |
| JP | 2016-222501 A | 12/2016 |
| JP | 2019-523745 A | 8/2019 |
| TW | 202142490 A * | 11/2021 |
| WO | WO-2020145343 A1 * | 7/2020 ........... C04B 35/443 |

OTHER PUBLICATIONS

Translation of CN 113329972 A (Year: 2021).*
Translation of WO-2021/068128 (Year: 2021).*
International Search Report issued in corresponding International Patent Application No. PCT/CN/2019/110133, dated Jul. 7, 2020.

* cited by examiner

EXAMPLE 1

EXAMPLE 3

PLATE-LIKE ALUMINA PARTICLE AND METHOD FOR MANUFACTURING PLATE-LIKE ALUMINA PARTICLE

CROSS REFERENCE TO RELATED APPLICATIONS

This patent application is the U.S. National Phase under 35 U.S.C. § 371 of International Application No. PCT/CN2019/110133, filed on Oct. 9, 2019, the entire contents of each are hereby incorporated by reference in their entirety.

TECHNICAL FIELD

The present invention relates to a plate-like alumina particle containing a coloring component and a method for manufacturing the plate-like alumina particle.

BACKGROUND ART

Alumina particles serving as inorganic fillers are used for various applications. In particular, plate-like alumina particles have more excellent thermal characteristics, optical characteristics, and the like than spherical alumina particles, and further improvements in characteristics have been required.

In recent years, inorganic material synthesis that learns from nature and living things has been intensively researched. In particular, a flux method is a method for precipitating crystals from a solution of an inorganic compound or a metal at high temperature by utilizing wisdom in creating crystals (minerals) in the natural world. Examples of advantages of the flux method include that crystals can grow at temperatures much lower than the melting temperature of the target crystal, that crystals having very few defects grow, and that the particle shape can be controlled.

To date, technologies to produce a-alumina by such a flux method have been reported. For example, PTL 1 discloses an invention related to an a-alumina macro-crystal that is a substantially hexagonal platelet single crystal, in which the diameter of the platelet is 2 to 20 μm, the thickness is 0.1 to 2 μm, and the ratio of the diameter to the thickness is 5 to 40. PTL 1 discloses that the a-alumina can be produced from transition alumina or hydrated alumina, and a flux. It is disclosed that the flux used at this time has a melting temperature of 800° C. or lower, contains chemically bonded fluorine, and melts, in a molten state, transition alumina or hydrated alumina.

Regarding production of plate-like alumina, a method for manufacturing plate-like alumina, in which silicon or a silicon compound containing a silicon element is used as a crystal control agent, is known (PTL 2). The technique disclosed in PTL 3 relates to octahedral alumina having a large particle diameter.

Meanwhile, in a case in which an alumina particle is subjected to coloring, it is possible to further improve utility values in areas of high brightness pigments, cosmetics, and the like. PTL 4 discloses an artificial corundum crystal which contains a seed crystal having a hexagonally dipyramidal shape as a basic shape, has specific crystal faces, and is derived from a hexagonally dipyramidal shape crystal, and in which nickel only; vanadium only; cobalt only; chromium only; iron and titanium; nickel, titanium, and iron; chromium and nickel; chromium, nickel, and iron; or chromium, titanium, and iron are added as a coloring component.

CITATION LIST

Patent Literature

[PTL 1] Japanese Unexamined Patent Application Publication No. H03-131517
[PTL 2] Japanese Unexamined Patent Application Publication No. 2016-222501
[PTL 3] PCT International Publication No. WO2018/112810
[PTL 4] Japanese Unexamined Patent Application Publication No. 2011-207761

Summary of Invention

Technical Problem

However, plate-like alumina particles in the related art disclosed in PTL 1, PTL 2, and PTL 3 are not colored, and the artificial corundum crystal in PTL 4 is not plate-like but hexagonally dipyramidal so that various characteristics caused by the plate-like shape are not exhibited.

The present invention was realized in consideration of such circumstances, and it is an object to provide a plate-like alumina particle containing a coloring component.

Solution to Problem

That is, the present invention has the following aspects.

(1) A plate-like alumina particle containing molybdenum, silicon, and a coloring component (2) The plate-like alumina particle according to (1) described above, in which the coloring component is at least one transition metal belonging to period 4

(3) The plate-like alumina particle according to (1) or (2) described above, in which the coloring component is at least one selected from a group consisting of chromium, iron, titanium, nickel, vanadium, and cobalt (4) The plate-like alumina particle according to any one of (1) to (3) described above, in which the plate-like alumina particle has at least one reflectance peak in a light reflection spectrum within a range of 360 to 740 nm (5) The plate-like alumina particle according to any one of (1) to (4) described above, in which a molar ratio [Si]/[Al] of Si to Al, determined based on XPS analysis, is 0.001 or more (6) The plate-like alumina particle according to any one of (1) to (5) described above, in which an average crystallite diameter of a (104) face is 150 nm or more, the average crystallite diameter being calculated from a full-width at half-maximum of a peak corresponding to a (104) face of diffraction peaks obtained based on XRD analysis (7) The plate-like alumina particle according to any one of (1) to (6) described above, in which an average crystallite diameter of a (113) face is 200 nm or more, the average crystallite diameter being calculated from a full-width at half-maximum of a peak corresponding to a (113) face of diffraction peaks obtained based on XRD analysis (8) The plate-like alumina particle according to any one of (1) to (7) described above, in which a shape is a hexagonal-plate-like shape (9) The plate-like alumina particle according to any one of (1) to (8) described above, in which the plate-like alumina particle is a single crystal

(10) A method for manufacturing the plate-like alumina particle according to any one of (1) to (9) described above, the method including the steps of mixing an aluminum compound containing an aluminum element, a molybdenum compound containing a molybdenum element, silicon or a silicon compound, and a coloring component so as to produce a mixture and calcining the resulting mixture

(11) A method for manufacturing the plate-like alumina particle according to any one of (1) to (9) described above, the method comprising the steps of mixing an aluminum compound containing an aluminum element, a molybdenum compound containing a molybdenum element, a potassium compound containing a potassium element, silicon or a silicon compound, and a coloring component so as to produce a mixture and calcining the resulting mixture

(12) The method for manufacturing a plate-like alumina particle according to (11) described above, the method including the steps of mixing the aluminum compound in an amount of 10% by mass or more in terms of $Al_2O_3$, the molybdenum compound in an amount of 20% by mass or more in terms of $MoO_3$, the potassium compound in an amount of 1% by mass or more in terms of $K_2O$, the silicon or silicon compound in an amount of less than 1% by mass in terms of $SiO_2$, and the coloring component in an amount such that a molar ratio of a coloring component element in the coloring component to the aluminum element in the aluminum compound (coloring component element/aluminum element) is 0.0001 to 0.1, wherein a total amount of raw materials is defined to be 100% by mass in terms of oxides, so as to produce a mixture and calcining the resulting mixture

(13) The method for manufacturing a plate-like alumina particle according to any one of (10) to (12) described above, the method further including the steps of taking out a plate-like alumina particle from the mixture after calcining and further calcining the plate-like alumina particle

(14) The method for manufacturing a plate-like alumina particle according to any one of (10) to (13) described above, in which the mixture further includes an yttrium compound containing an yttrium element Advantageous Effects of Invention According to the present invention, a plate-like alumina particle containing a coloring component can be provided.

DESCRIPTION OF EMBODIMENTS

Figure 1:
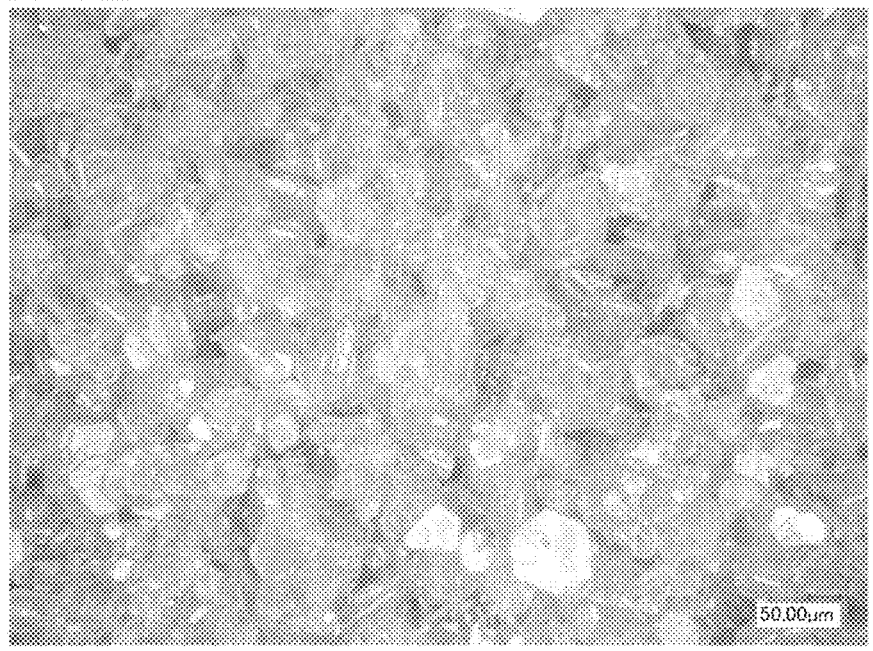
FIG. 1 is a microscope observation image of plate-like alumina particles obtained in Example 1.

An embodiment of a plate-like alumina particle and a method for manufacturing a plate-like alumina particle according to the present invention will be described below.

<<Plate-Like Alumina Particle>>

A plate-like alumina particle according to the embodiment contains molybdenum, silicon, and a coloring component. Further, the plate-like alumina particle according to the embodiment may contain impurities derived from raw materials and the like as long as the effects of the present invention are not impaired. In this regard, the plate-like alumina particle may further contain an organic compound and the like.

The plate-like alumina particle based on a-alumina according to the embodiment may be obtained by any manufacturing method as long as molybdenum, silicon, and a coloring component is contained. Preferably, the plate-like alumina particle is obtained by mixing an aluminum compound, a molybdenum compound, silicon or a silicon compound, and a coloring component so as to produce a mixture and calcining the resulting mixture because the plate-like alumina particle having a higher aspect ratio and excellent brilliance can be manufactured. Further preferably, the plate-like alumina particle is obtained by mixing an aluminum compound, a molybdenum compound, a potassium compound, silicon or a silicon compound, and a coloring component so as to produce a mixture and calcining the resulting mixture because the plate-like alumina particle having a higher aspect ratio and further excellent brilliance can be manufactured. In addition, it is preferable that the mixture further include a metal compound as will be described later. The metal compound may be used in combination or may not be used. However, the crystal can be more simply controlled by using the metal compound in combination. Regarding the metal compound, it is recommended to use an yttrium compound for the purpose of facilitating crystal growth such that resulting a-type plate-like alumina particles have uniform crystal shapes, sizes, and the like. In addition, it is preferable that the mixture further include a sodium compound as a shape controlling agent other than silicon or a silicon compound.

In the above-described manufacturing method, the molybdenum compound is used as a flux agent. In the present specification, the manufacturing method in which the molybdenum compound is used as the flux agent may also be simply referred to as a "flux method" hereafter. The flux method will be described later in detail. In this regard, when the molybdenum compound and the potassium compound are used as a flux agent, the molybdenum compound reacts with the potassium compound by such calcination so as to form potassium molybdate. At the same time, the molybdenum compound reacts with the aluminum compound so as to form aluminum molybdate and, thereafter, aluminum molybdate is decomposed in the presence of potassium molybdate, crystal growth advances in the presence of the silicon or silicon compound and, thereby, the plate-like alumina particle having a large particle size can be obtained. That is, when an alumina particle is manufactured via aluminum molybdate serving as an intermediate, if potassium molybdate is present, the alumina particle having a large particle size is obtained. In addition, it is considered that the molybdenum compound is taken into the plate-like alumina particle during crystal growth. The above-described flux method is one type of flux slow cooling method, and it is considered that crystal growth advances in liquid phase potassium molybdate. Further, potassium molybdate can be readily recovered by washing with water, ammonia water, or an inorganic base aqueous solution, for example, sodium hydroxide aqueous solution or potassium hydroxide aqueous solution, and be reused.

In addition, by using the molybdenum compound, the flux method can be performed without using a toxic flux agent containing Pb, F, or the like, which is advantageous for easy industrialization.

In the above-described manufacturing method, the silicon or silicon compound is used as a shape controlling agent and plays an important role in growing a plate-like crystal of alumina.

The alumina particle has a high a-crystal ratio, a large particle size, and a plate-like shape by utilizing the molybdenum compound, the potassium compound, and the silicon or silicon compound in the above-described manufacturing of the plate-like alumina particle. Therefore, excellent dispersibility, mechanical strength, and brilliance can be realized.

The coloring component in the plate-like alumina particle according to the present embodiment has a function of changing a color of an aluminum oxide crystal in a case in which the coloring component is mixed, compared with a case in which the coloring component is not mixed.

As the coloring component, for example, at least one transition metal belonging to period 4 is preferable. The coloring component will be described later in detail.

The shape of the plate-like alumina particle can be controlled by the ratio of, for example, the molybdenum compound, the potassium compound, and the silicon or silicon compound used and, in particular, be controlled by the ratio of the molybdenum compound and the silicon or silicon compound used.

The color of the plate-like alumina particle can be controlled by the type and the use ratio of the coloring component.

The amount of molybdenum and the amount of silicon contained in the plate-like alumina particle and a preferable ratio of the raw materials used will be described later in detail.

Preferably, the crystal type of the plate-like alumina particle according to the embodiment is an a-type (corundum crystal), as described later (a-alumina is preferable).

The shape of the plate-like alumina particle according to the embodiment is a plate-like shape. "Plate-like" in the present invention means to have an aspect ratio of 2 or more, where the aspect ratio is determined by dividing the major axis of an alumina particle by the thickness.

When the plate-like alumina particle according to the embodiment is plate-like, it is possible to reflect incident light efficiently so that the plate-like alumina particle has excellent brilliance.

Regarding the shape of the plate-like alumina particle according to the embodiment, preferably, the major axis is 30 μm or more, the thickness is 3 μm or more, and the aspect ratio that is the ratio of the major axis to the thickness is 2 to 50.

The plate-like alumina particles in the related art disclosed in PTL 1, PTL 2, and PTL 3 do not satisfy the above-described factors of the major axis, the thickness, and the aspect ratio. Consequently, alumina particles in the related art lack a feeling of brilliance probably due to a non-plate-like shape or a small particle size.

Meanwhile, the alumina particles having different crystal habit from the plate-like shape disclosed in PTL 3 and PTL 4 (further, alumina particles having different habitus) have very poor brilliance when compared with the plate-like alumina particle according to the embodiment, where the particle diameters are substantially the same. The reason for this is conjectured to be that, regarding the polyhedral alumina, incident light is not totally reflected in contrast to the plate-like alumina but is reflected at some surfaces (diffused reflection occurs).

The plate-like alumina particle according to the embodiment can have further excellent brilliance by including the above-described features of the major axis, the thickness, and the aspect ratio.

The plate-like alumina particle according to the embodiment described above is plate-like and has a large particle size. Therefore, it is conjectured that a light reflection surface is large and intense brilliance can be exhibited. In this regard, "particle size" in the present specification takes values of a major axis and a thickness into consideration. "Brilliance" means a visual recognition possibility of glittering light that is generated due to reflection of light by the alumina particle.

In this regard, in the present specification, "thickness of alumina particle" means an arithmetic average value of measured thicknesses of at least 50 alumina particles arbitrarily selected from an image obtained by a microscope. "Major axis of alumina particle" means an arithmetic average value of measured major axes of at least 50 plate-like alumina particles arbitrarily selected from an image obtained by a microscope. "Major axis" means a maximum length of distances between two points on a border line of an alumina particle.

Regarding the shape of the plate-like alumina particle according to the embodiment, preferably, the major axis is 30 μm or more, the thickness is 3 μm or more, and the aspect ratio that is the ratio of the major axis to the thickness is 2 to 50. The major axis of the plate-like alumina particle is 30 μm or more and, thereby, an excellent feeling of brilliance can be exhibited. The thickness of the plate-like alumina particle is 3 μm or more and, thereby, an excellent feeling of brilliance can be exhibited. In addition, excellent mechanical strength can be provided. The aspect ratio of the plate-like alumina particle is 2 or more and, thereby, an excellent feeling of brilliance can be exhibited. In addition, two-dimensional orientation characteristics can be provided. The aspect ratio of the plate-like alumina particle is 50 or less and, thereby, excellent mechanical strength can be provided. The plate-like alumina particles according to the embodiment can further have a more excellent feeling of brilliance, mechanical strength, and two-dimensional orientation characteristics by improving uniformity of the shape, the size, and the like. Therefore, the major axis is preferably 50 to 200 μm, the thickness is preferably 5 to 60 μm, and the aspect ratio that is the ratio of the major axis to the thickness is preferably 3 to 30.

Regarding the above-described preferable shape of the alumina particle, conditions of a thickness, an average particle diameter, and an aspect ratio can be arbitrarily combined as long as the shape is plate-like.

The plate-like alumina particle according to the embodiment may have a circular-plate-like shape or an elliptical-plate-like shape. However, it is preferable that the particle shape be, for example, a polygonal-plate-like shape, from the viewpoints of optical characteristics, handleability, ease of manufacturing, and the like. A hexagonal-plate-like shape is more preferable from the viewpoint of exhibition of particularly excellent brilliance.

Here, hexagonal-plate-like plate-like alumina particle is assumed to be a particle which has an aspect ratio of 2 or more and in which the number of sides having a length of 0.6 or more (including the longest side) relative to the length of the longest side of 1 is 6 and, in addition, the total length of the sides having a length of 0.6 or more is 0.9 L or more relative to the length of the perimeter of 1 L. In connection with the observation conditions of the particle, when it is clear that a side has become not straight because of an occurrence of chipping of the particle, the side may be measured after being revised to a straight line. Likewise, even when a portion corresponding to the corner of the hexagon is slightly rounded, measurement may be performed after the corner is revised to an intersection of straight lines. The aspect ratio of the hexagonal-plate-like plate-like alumina particle is preferably 3 or more.

The plate-like alumina particle according to the embodiment preferably includes the hexagonal-plate-like alumina particle and a proportion of the hexagonal-plate-like plate-like alumina particle is preferably 30% or more by calculation on a number basis, where the total number of plate-like alumina particles is assumed to be 100%, and particularly preferably 80% or more because brilliance can be enhanced more due to an increase in regular reflection of light by the hexagonal-plate-like shape.

An average crystallite diameter of the (104) face of the plate-like alumina particle according to the embodiment is preferably 150 nm or more, more preferably 200 nm or more, and further preferably 300 nm or more.

There is no particular limitation regarding the upper limit value of the average crystallite diameter, and for example, the average crystallite diameter of the (104) face of the plate-like alumina particle according to the embodiment may be 150 to 700 nm, 200 to 600 nm, or 300 to 600 nm.

In this regard, the average value of the size of the crystal domain of the (104) face corresponds to the average crystallite diameter of the (104) face. It is considered that, as the average crystallite diameter increases, the light reflection surface increases and high brilliance can be exhibited. The crystallite diameter of the (104) face of the plate-like alumina particle can be controlled by appropriately setting the condition for a manufacturing method described later. In the present specification, the value calculated, by using Scherrer equation, based on the full-width at half-maximum of a peak (peak that appears at approximately $2\theta=35.2$ degrees) that is attributed to the (104) face and that is measured by using X-ray diffraction (XRD) is adopted as the value of the "average crystallite diameter of the (104) face".

Meanwhile, an average crystallite diameter of the (113) face of the plate-like alumina particle according to the embodiment is preferably 200 nm or more, more preferably 250 nm or more, and further preferably 300 nm or more.

There is no particular limitation regarding the upper limit value of the average crystallite diameter, and the average crystallite diameter of the (113) face of the plate-like alumina particle according to the embodiment may be 200 to 1,000 nm, 250 to 500 nm, or 300 to 500 nm.

In this regard, the average value of the size of the crystal domain of the (113) face corresponds to the average crystallite diameter of the (113) face. It is considered that, as the average crystallite diameter increases, the light reflection surface increases and high brilliance can be exhibited. The crystallite diameter of the (113) face of the plate-like alumina particle can be controlled by appropriately setting the condition for a manufacturing method described later. In the present specification, the value calculated, by using Scherrer equation, based on the full-width at half-maximum of a peak (peak that appears at approximately $2\theta=43.4$ degrees) that is attributed to the (113) face and that is measured by using X-ray diffraction (XRD) is adopted as the value of the "average crystallite diameter of the (113) face".

The XRD analysis is performed under the same condition as the measurement condition cited in the example described later or a compatible condition for obtaining the same measurement result.

Preferably, the plate-like alumina particle according to the embodiment is a single crystal. The single crystal means a crystal grain composed of a single composition in which unit lattices are orderly arranged. In many cases, a high-quality crystal is transparent and generates reflected light. If part of a crystal is stepwise or a surface is constricted at an acute angle, it is conjectured that the crystal is a polycrystal in which a plurality of crystal components overlap one another. The measurement for determining whether a particle is a single crystal is performed under the same condition as the measurement condition cited in the example described later or a compatible condition for obtaining the same measurement result. Preferably, the plate-like alumina particle according to the embodiment includes the single crystal alumina particle. The plate-like alumina particle being a single crystal refers to the particle having high quality, and it is conjectured that excellent brilliance is exhibited.

The thickness, the major axis, the aspect ratio, the shape, the crystallite diameter, and the like of the plate-like alumina particle according to the embodiment can be controlled by selecting, for example, the ratio of the aluminum compound, the molybdenum compound, the potassium compound, the silicon or silicon compound, and the metal compound, which serve as the raw materials described later, used.

[Alumina]

"Alumina" contained in the plate-like alumina particle according to the embodiment is aluminum oxide and may be transition alumina having a crystal form of, for example, γ, δ, θ, or κ, or the transition alumina may contain an alumina hydrate. However, being basically α-crystal form (α-type) is preferable because of more excellent mechanical strength or brilliance. The α-crystal form is a dense crystal structure of alumina and there are advantages in an improvement of mechanical strength or brilliance of the plate-like alumina according to the present invention.

It is preferable that the α-crystallization rate approach 100% as much as possible because properties intrinsic to the a-crystal form are readily exhibited. The α-crystallization rate of the plate-like alumina particle according to the embodiment is, for example, 90% or more, preferably 95% or more, and more preferably 99% or more.

[Molybdenum]

Meanwhile, the plate-like alumina particle according to the embodiment contains molybdenum. The molybdenum is derived from the molybdenum compound used as the flux agent.

Molybdenum has a catalytic function and an optical function. In addition, by utilizing molybdenum, in a manufacturing method as described later, a plate-like alumina particle having excellent brilliance can be manufactured. Further, when the amount of molybdenum used is increased, a hexagonal-plate-like alumina particle having a large particle size and a large crystallite diameter is readily obtained, and the resulting alumina particle tends to have further excellent brilliance. In this regard, application to use for an oxidation reaction catalyst or an optical material may become possible by utilizing characteristics of molybdenum contained in the plate-like alumina particle.

There is no particular limitation regarding the molybdenum, and molybdenum oxide, molybdenum compound that is partly reduced, molybdate, or the like is contained other than the molybdenum metal. Molybdenum may be contained in the plate-like alumina particle in any polymorphic forms of molybdenum compounds or in a combination thereof, or may be contained in the plate-like alumina particle in the form of $\alpha$-$MoO_3$, $\beta$-$MoO_3$, $MoO_2$, MoO, molybdenum cluster structure, or the like.

There is no particular limitation regarding the form of molybdenum contained. Molybdenum may be contained in the form of being attached to the surface of the plate-like alumina particle or in the form of being substituted for some of aluminum in the crystal structure of alumina, or these may be combined.

The content of molybdenum as molybdenum trioxide is preferably 10% by mass or less relative to 100% by mass of the plate-like alumina particle according to the embodiment, more preferably 0.1% to 5% by mass when the calcination temperature, the calcination time, and the sublimation rate of the molybdenum compound are adjusted. From the viewpoint of appropriately improving the color development of the plate-like alumina particle, the content of molybdenum is more preferably 0.1% to 2% by mass and further preferably 0.3% to 1% by mass. The molybdenum content of 10% by mass or less is preferable because the quality of a-single crystal of alumina is improved. The molybdenum content of 0.1% by mass or more is preferable because the shape of the resulting plate-like alumina particle improves the brilliance.

The molybdenum content can be determined by XRF analysis. The XRF analysis is performed under the same condition as the measurement condition cited in the example described later or a compatible condition for obtaining the same measurement result.

[Silicon]

The plate-like alumina particle according to the embodiment further contains silicon in addition to molybdenum. The silicon is derived from the silicon or silicon compound used as the raw material. By utilizing silicon, in a manufacturing method as described later, a plate-like alumina particle having excellent brilliance can be manufactured. Further, when the amount of silicon used is decreased to some extent, a hexagonal-plate-like alumina particle having a large particle size and a large crystallite diameter is readily obtained, and the resulting alumina particle tends to have further excellent brilliance. A preferable amount of silicon used will be described later.

The plate-like alumina particle according to the embodiment may contain silicon in the surface layer. In this regard, "surface layer" means a layer within 10 nm from the surface of the plate-like alumina particle according to the embodiment. This distance corresponds to the detection depth of XPS used for the measurement in the example.

In the plate-like alumina particle according to the embodiment, silicon may be unevenly distributed in the surface layer. In this regard, "being unevenly distributed in the surface layer" means a state in which the mass of silicon per unit volume of the surface layer is greater than the mass of silicon per unit volume of the portion other than the surface layer. Uneven distribution of silicon in the surface layer can be identified by comparing the result of surface analysis based on XPS and the result of overall analysis based on XRF.

Silicon contained in the plate-like alumina particle according to the embodiment may be a silicon simple substance or be silicon in the silicon compound. The plate-like alumina particle according to the embodiment may contain at least one selected from a group consisting of Si, SiO2, SiO, and aluminum silicate produced by reacting with alumina as the silicon or silicon compound, and the above-described substance may be included in the surface layer.

The plate-like alumina particle according to the embodiment contains silicon in the surface layer and, therefore, Si is detected by XPS analysis. The plate-like alumina particle according to the embodiment has a value of a molar ratio [Si]/[Al] of Si to Al, determined based on XPS analysis, of preferably 0.001 or more, more preferably 0.01 or more, and further preferably 0.02 or more. The entire surface of the plate-like alumina particle may be covered with the silicon or silicon compound, or at least part of the surface of the plate-like alumina particle may be covered with the silicon or silicon compound.

There is no particular limitation regarding the upper limit of the value of the molar ratio [Si]/[Al] determined based on XPS analysis, and 0.4 or less is preferable, 0.3 or less is more preferable, and 0.2 or less is further preferable.

The plate-like alumina particle according to the embodiment has a value of the molar ratio [Si]/[Al] of Si to Al, determined based on XPS analysis, of preferably 0.001 or more and 0.4 or less, more preferably 0.01 or more and 0.3 or less, and further preferably 0.02 or more and 0.2 or less.

The plate-like alumina particle having a value of the molar ratio [Si]/[Al], determined based on XPS analysis, within the above-described range is preferable because of having an appropriate amount of Si contained in the surface layer, being plate-like, and having a large particle size and more excellent brilliance.

The XPS analysis is performed under the same condition as the measurement condition cited in the example described later or a compatible condition for obtaining the same measurement result.

The plate-like alumina particle according to the embodiment contains silicon corresponding to the silicon or silicon compound used in the manufacturing method. The content of silicon as silicon dioxide determined based on XRF analysis is preferably 10% by mass or less relative to 100% by mass of the plate-like alumina particle, more preferably 0.001% to 3% by mass, further preferably 0.01% to 1% by mass, and particularly preferably 0.03% to 0.3% by mass. The plate-like alumina particle having a content of silicon within the above-described range is preferable because of having an appropriate amount of Si, being plate-like, and having a large particle size and more excellent brilliance.

The XRF analysis is performed under the same condition as the measurement condition cited in the example described later or a compatible condition for obtaining the same measurement result.

[Potassium]

The plate-like alumina particle according to the embodiment may contain potassium.

In a case in which the potassium is used in the method for manufacturing a plate-like alumina particle described later, the potassium may be derived from a potassium compound serving as the raw materials.

There is no particular limitation regarding the potassium, and potassium oxide, potassium compound that is partly reduced, or the like is contained other than the potassium metal.

There is no particular limitation regarding the form of potassium contained. Potassium may be contained in the form of being attached to the surface of the plate-like alumina particle according to the embodiment or in the form of being substituted for some of aluminum in the crystal structure of alumina, or these may be combined.

The content of potassium as $K_2O$ determined based on XRF analysis may be 0.01% by mass or more, 0.01% to 5% by mass, 0.05% to 3% by mass, or 0.05% to 1% by mass relative to 100% by mass of the plate-like alumina particle.

The XRF analysis is performed under the same condition as the measurement condition cited in the example described later or a compatible condition for obtaining the same measurement result.

[Coloring component]

The plate-like alumina particle according to the embodiment further contains a coloring component in addition to molybdenum and silicon.

Preferably, the coloring component is at least one transition metal belonging to period 4 of the periodic table. More preferably, the coloring component is at least one selected from a group consisting of chromium, iron, titanium, nickel, vanadium, and cobalt.

When at least one transition metal belonging to period 4 of the periodic table is used as a coloring component, a part of the aluminum elements in the produced crystal is substituted with the transition metal element and the transition metal element is incorporated into the crystal structure. By adopting a crystal structure in which a part of aluminum is substituted with the transition metal, it is advantageous for preventing the outflow of the transition metal (coloring component) so as to obtain a plate-like alumina particle having high safety and resistance to discoloration. In this case, from the color development principle, the coloring component is preferably present in the plate-like alumina particle homogeneously.

To explain without considering the coloration based on molybdenum, generally, the larger the layer thickness corresponding to the coloring component compared to the layer thickness of the alumina itself, and the higher the concentration of the coloring component contained in the alumina itself, there is a tendency for the color intensity of a specific color to increase. The peak intensity of the reflection spectrum described later has the same tendency as described above. The color depth based on the layer thickness and concentration of the coloring component may gradually change as the layer thickness or concentration increases or decreases, or the color depth may change critically and rapidly at a certain layer thickness or specific concentration. Based on general knowledge, it is possible to provide alumina that develops a specific color and a desired color in consideration of the presence of molybdenum and the coloring principle described later.

When the type or the amount of the transition metal contained in the plate-like alumina particle according to the embodiment is changed, the plate-like alumina particle can be developed in different shades. For example, in a case in which the plate-like alumina particle contains chromium as a coloring component, the color of the plate-like alumina particle identified by the naked eye is red or pink. In a case in which the plate-like alumina particle contains cobalt as a coloring component, the color of the plate-like alumina particle identified by the naked eye is blue. In a case in which the plate-like alumina particle contains iron and titanium as a coloring component, the color of the plate-like alumina particle identified by the naked eye is blue. In a case in which the plate-like alumina particle contains nickel as a coloring component, the color of the plate-like alumina particle identified by the naked eye is green.

Since a crystal consisting of aluminum oxide is inherently colorless and transparent, the reflection spectrum showing the reflectance of each wavelength measured by the colorimeter does not have a clear peak. Meanwhile, it is ascertained that a plate-like alumina particle containing the above-described coloring component has a peak in the reflection spectrum.

For example, the plate-like alumina particle according to the embodiment may have at least one reflectance peak within a wavelength range of 360 to 740 nm and may have at least one reflectance peak within a range of 440 to 740 nm, in the reflection spectrum.

Regarding the reflectance peak, for example, a spectrum having a maximum difference of 5% or more in the height of the reflectance within the wavelength range can be regarded as a peak. A baseline is taken based on the peak inflection point so as to determine the peak shape. A wavelength range of full-width at half-maximum is adopted as the wavelength range of the peak.

The plate-like alumina particle according to the embodiment may have, for example, at least one reflectance peak in the reflection spectrum and preferably has at least one of the following peak wavelengths (peak top, that is, maximum value in the peak).

The plate-like alumina particle according to the embodiment preferably has a reflectance peak wavelength within a wavelength range of 690 to 710 nm, and preferably has a peak wavelength of a reflectance of 30% or more, more preferably has a peak wavelength of a reflectance of 80% or more, further preferably has a peak wavelength of a reflectance of 100% or more, and particularly preferably has a peak wavelength of a reflectance of 150% or more, within the range. Since the function as a fluorescent material is expressed and incident light is converted to another wavelength, a case in which the reflectance exceeds 100% occurs.

The full-width at half-maximum of the peak having the peak wavelength may be, for example, 10 to 30 nm or 15 to 25 nm.

The plate-like alumina particle according to the embodiment preferably has a reflectance peak wavelength within a wavelength range of 620 to 660 nm, and more preferably has a peak wavelength of a reflectance of 30% or more and further preferably has a peak wavelength of a reflectance of 60% or more within the range.

The full-width at half-maximum of the peak having the peak wavelength may be, for example, 20 to 60 nm or 30 to 50 nm.

The plate-like alumina particle according to the embodiment preferably has a reflectance peak wavelength within a wavelength range of 380 to 520 nm, and more preferably has a peak wavelength of a reflectance of 20% or more and further preferably has a peak wavelength of a reflectance of 30% or more within the range.

The plate-like alumina particle according to the embodiment preferably has a reflectance peak wavelength within a wavelength range of 420 to 520 nm, and more preferably has a peak wavelength of a reflectance of 20% or more and further preferably has a peak wavelength of a reflectance of 30% or more within the range.

The plate-like alumina particle according to the embodiment preferably has a reflectance peak wavelength within a wavelength range of 460 to 560 nm, and more preferably has a peak wavelength of a reflectance of 20% or more and further preferably has a peak wavelength of a reflectance of 30% or more within the range.

When the plate-like alumina particle according to the embodiment has a reflectance peak wavelength, a preferred coloring of the alumina particle is obtained. Further, for example, having a peak wavelength of the above-described reflectance is preferable because a plate-like alumina particle having a brighter color development can be obtained.

The content of the coloring component element in the plate-like alumina particle according to the embodiment needs to be an amount such that the coloring of an alumina particle containing a coloring component can be identified as compared with an alumina particle not containing the coloring component. For example, the content of the coloring component element, determined based on XRF analysis, may be 0.01% by mass or more, 0.01% to 10% by mass, 0.05% to 5% by mass, or 0.1% to 3% by mass relative to 100% by mass of the plate-like alumina particle. In particular, the content of the coloring component element being 5% by mass or less is preferable because the color development of the plate-like alumina particle can be made particularly favorable.

Meanwhile, in a case in which the coloring component is formed from a plurality of types of elements, the amount of the coloring component element is a value obtained by summing the amounts of the plurality of types of elements.

The XRF analysis is performed under the same condition as the measurement condition cited in the example described later or a compatible condition for obtaining the same measurement result.

[Incidental Impurities]

The plate-like alumina particle may contain incidental impurities.

Incidental impurities refer to impurities that are derived from the metal compound used in the production, present in the raw materials, or incidentally mixed into the plate-like alumina particle in the production step, that are essentially unnecessary, but that are in a trace amount and have no influence on the characteristics of the plate-like alumina particle.

There is no particular limitation regarding the incidental impurities. Examples of the incidental impurities include magnesium, calcium, strontium, barium, scandium, yttrium, lanthanum, cerium, and sodium. These incidental impurities may be contained alone, or at least two types may be contained.

The content of the incidental impurities in the plate-like alumina particle is preferably 10,000 ppm or less, more preferably 1,000 ppm or less, and further preferably 500 ppm or less relative to the mass of the plate-like alumina particle.

(Other Atoms)

Other atoms refer to atoms intentionally added to the plate-like alumina particle for the purpose of providing mechanical strength or electrical and magnetic functions within the bounds of not impairing the effects of the present invention.

There is no particular limitation regarding the other atoms, and examples of the other atoms include zinc, manganese, calcium, strontium, and yttrium. These other atoms may be used alone, or at least two types may be used in combination.

The content of the other atoms in the plate-like alumina particle is preferably 5% by mass or less and more preferably 2% by mass or less relative to the mass of the plate-like alumina particle.

[Organic Compound]

In an embodiment, the plate-like alumina particle may contain an organic compound. The organic compound is present in the surface of the plate-like alumina particle and has a function of adjusting the surface properties of the plate-like alumina particle. For example, the plate-like alumina particle containing the organic compound in the surface has improved affinity for a resin and, therefore, the plate-like alumina particle can perform functions as a filler to the greatest extent.

There is no particular limitation regarding the organic compound, and examples of the organic compound include organic silane, alkylphosphonic acid, and a polymer.

Examples of the organic silane include alkyltrimethoxysilanes or alkyltrichlorosilanes having a carbon number of an alkyl group of 1 to 22 such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, and hexyltrimethoxysilane, 3,3,3-trifluoropropyltrimethoxysilane, (tridecafluoro-1,1,2,2-tetrahydrooctyl)trichlorosilanes, phenyltrimethoxysilane, phenyltriethoxysilane, p-chloromethylphenyltrimethoxysilane, and p-chloromethylphenyltriethoxysilanes.

Examples of the alkylphosphonic acid include methylphosphonic acid, ethylphosphonic acid, propylphosphonic acid, butylphosphonic acid, pentylphosphonic acid, hexylphosphonic acid, heptylphosphonic acid, octylphosphonic acid, decylphosphonic acid, dodecylphosphonic acid, octadecylphosphonic acid, 2-ethylhexylphosphonic acid, cyclohexylmethylphosphonic acid, cyclohexylethylphosphonic acid, benzylphosphonic acid, phenylphosphonic acid, and dodecylbenzenephosphonic acid.

Regarding the polymer, for example, poly(meth)acrylates are suitable for use. Specific examples of the polymer include polymethyl (meth)acrylate, polyethyl (meth)acrylate, polybutyl (meth)acrylate, polybenzyl (meth)acrylate, polycyclohexyl (meth)acrylate, poly(t-butyl (meth)acrylate), polyglycidyl (meth)acrylate, and polypentafluoropropyl (meth)acrylate. In addition, general-purpose polymers, for example, polystyrene, polyvinyl chloride, polyvinyl acetate, an epoxy resin, polyester, polyimide, and polycarbonate may be included.

In this regard, the above-described organic compounds may be contained alone, or at least two types may be contained.

There is no particular limitation regarding the form of the organic compound contained. The organic compound may be bonded to the alumina by a covalent bond or may cover the alumina.

The content of the organic compound is preferably 20% by mass or less and further preferably 10% to 0.01% by mass relative to the mass of the plate-like alumina particle. The content of the organic compound being 20% by mass or less is preferable because the physical properties resulting from the plate-like alumina particle can readily be realized.

As described above, the plate-like alumina particle according to the embodiment is excellent in achieving both the formation of the plate-like shape and the coloring.

In particular, it is innovative that in a case in which the coloring component is at least one transition metal belonging to period 4, the shape control of the crystal structure is not inhibited during crystal formation and a colored plate-like alumina particle can be obtained while achieving both the formation of the plate-like shape and the incorporation of the transition metal into the crystal structure.

Furthermore, since the plate-like alumina particle according to the embodiment is a single crystal, has a predetermined average crystallite diameter, and has an appropriate content of molybdenum, it is possible to provide a plate-like alumina particle having very excellent aesthetic appearance with improved brilliance and further enhanced coloring effect.

Since the plate-like alumina particle according to the embodiment has excellent aesthetic appearance, for example, a cosmetic containing the plate-like alumina particle according to the embodiment can be provided.

Examples of the cosmetic include makeup cosmetics such as nail polish, eye shadow, foundation, blusher, lipstick, and lip gloss.

<<Method for Manufacturing Plate-Like Alumina Particle>>

There is no particular limitation regarding the method for manufacturing the plate-like alumina particle according to the embodiment, and a known technique can be appropriately applied. It is preferable that a manufacturing method based on the flux method in which the molybdenum compound is used be applied from the viewpoint of appropriate controllability of alumina having a high a-crystallization rate at relatively low temperature.

In more detail, a preferable method for manufacturing the plate-like alumina particle may include a step (first calcination step) of calcining the aluminum compound in the presence of the molybdenum compound, the silicon or silicon compound, and the coloring component.

A more preferable method for manufacturing the plate-like alumina particle may include a step (first calcination step) of calcining the aluminum compound in the presence of the molybdenum compound, the potassium compound, the silicon or silicon compound, and the coloring component.

The first calcination step may be a step of calcining a mixture obtained in a step (mixing step) of obtaining the mixture that is a target for calcination. Preferably, the mixture contains a metal compound as described later. Preferably, the metal compound is an yttrium compound.

For example, a compound containing molybdenum and potassium, which is suitable for the flux agent, can be produced in a calcination process using a molybdenum compound and a potassium compound, which are more inexpensive and easily available, as the raw materials. Hereinafter, both of a case in which a molybdenum compound and a potassium compound are used as a flux agent and a case in which a compound containing molybdenum and potassium is used as a flux agent will be collectively described by taking a case in which a molybdenum compound and a potassium compound are used as the flux agent, as an example.

[Mixing Step]

The mixing step is a step of mixing raw materials, for example, the aluminum compound, the molybdenum compound, the silicon or silicon compound, and the coloring component, so as to produce the mixture. The content of the mixture will be described below.

(Aluminum Compound)

The aluminum compound is a raw material for the plate-like alumina particle according to the embodiment.

There is no particular limitation regarding the aluminum compound as long as the alumina particle is produced by heat treatment. Examples of the aluminum compound include an aluminum metal, aluminum sulfide, aluminum nitride, aluminum fluoride, aluminum chloride, aluminum bromide, aluminum iodide, aluminum sulfate, sodium aluminum sulfate, potassium aluminum sulfate, ammonium aluminum sulfate, aluminum nitrate, aluminum aluminate, aluminum silicate, aluminum phosphate, aluminum lactate, aluminum laurate, aluminum stearate, aluminum oxalate, aluminum acetate, aluminum subacetate, aluminum propoxide, aluminum butoxide, aluminum hydroxide, boehmite, pseudo-boehmite, transition alumina (γ-alumina, δ-alumina, θ-alumina, and the like), a-alumina, and mixed alumina having at least two crystal phases. In particular, transition alumina, boehmite, pseudo-boehmite, aluminum hydroxide, aluminum chloride, aluminum sulfate, and aluminum nitrate and hydrates of these are used preferably, and transition alumina, boehmite, pseudo-boehmite, and aluminum hydroxide are used more preferably. When a-alumina is obtained as the plate-like alumina particle, it is preferable that alumina containing substantially no a-alumina, for example, relatively inexpensive transition alumina containing γ-alumina as a primary component be used as the above-described raw material. As described above, the plate-like alumina particle having a specific shape and size different from the shape and the size of the raw material can be obtained as a product by calcining the raw material.

The above-described aluminum compounds may be used alone, or at least two types may be used in combination.

Regarding the aluminum compound, a commercially available product may be used, or in-house preparation may be performed.

When the aluminum compound is prepared in-house, for example, the alumina hydrate or the transition alumina having high structural stability at high temperature can be prepared by neutralizing an aluminum aqueous solution. In more detail, the alumina hydrate can be prepared by neutralizing an acidic aqueous solution of aluminum by a base, and the transition alumina can be prepared by heat-treating the alumina hydrate obtained as described above. In this regard, the thus obtained alumina hydrate or transition alumina has high structural stability at high temperature and, therefore, the plate-like alumina particle having a large particle size tends to be obtained by calcination in the presence of the molybdenum compound and the potassium compound.

There is no particular limitation regarding the shape of the aluminum compound, and any one of a spherical structure, an amorphous structure, a structure having an aspect (for example, wire, fiber, ribbon, or tube), a sheet, and the like is suitable for use.

There is no particular limitation regarding the average particle diameter of the aluminum compound, and 5 nm to 10,000 μm is preferable.

The aluminum compound may constitute a composite with an organic compound. Examples of the composite include an organic-inorganic composite obtained by modifying the aluminum compound by using organic silane, a composite of the aluminum compound with a polymer adsorbed, and a composite in which the aluminum compound is covered with an organic compound. When these composites are used, there is no particular limitation regarding the content of the organic compound. However, 60% by mass or less is preferable, and 30% by mass or less is more preferable.

The molar ratio (molybdenum element/aluminum element) of the molybdenum element in the molybdenum compound to the aluminum element in the aluminum compound is preferably 0.01 to 3.0 and more preferably 0.1 to 1.0. For the purpose of favorably advancing crystal growth with good productivity, 0.30 to 0.70 is further preferable. The molar ratio (molybdenum element/aluminum element) being within the above-described range is preferable because the plate-like alumina particle having a large particle size can be obtained.

(Molybdenum Compound)

There is no particular limitation regarding the molybdenum compound, and examples of the molybdenum compound include a molybdenum metal, molybdenum oxide, molybdenum sulfide, lithium molybdate, sodium molybdate, potassium molybdate, calcium molybdate, ammonium molybdate, phosphomolybdic acid ($H_3PMo_{12}O_{40}$), and silicomolybdic acid ($H4SiMo_{12}O_{40}$). In this regard, the molybdenum compounds include isomers. For example, molybdenum oxide may be molybdenum(IV) dioxide ($MoO_2$) or molybdenum(VI) trioxide ($MoO_3$). Meanwhile, potassium molybdate has a structural formula of $K_2Mo_nO_{3n+1}$, and n may be 1, 2, or 3. In particular, molybdenum trioxide, molybdenum dioxide, ammonium molybdate, and potassium molybdate are preferable, and molybdenum trioxide is more preferable.

In this regard, the above-described molybdenum compounds may be used alone, or at least two types may be used in combination.

In addition, potassium molybdate ($K2Mo_nO_{3n+1}$, n=1 to 3) contains potassium and, therefore, may have functions as the potassium compound described later. In the manufacturing method according to the embodiment, using potassium molybdate as a flux agent corresponds to using a molybdenum compound and a potassium compound as a flux agent.

(Potassium Compound)

Preferably, the mixture in the mixing step contains a potassium compound.

There is no particular limitation regarding the potassium compound, and examples of the potassium compound include potassium chloride, potassium chlorite, potassium chlorate, potassium sulfate, potassium hydrogen sulfate, potassium sulfite, potassium hydrogen sulfite, potassium nitrate, potassium carbonate, potassium hydrogen carbonate, potassium acetate, potassium oxide, potassium bromide, potassium bromate, potassium hydroxide, potassium silicate, potassium phosphate, potassium hydrogen phosphate, potassium sulfide, potassium hydrogen sulfide, potassium molybdate, and potassium tungstate. In this regard, the above-described potassium compounds include isomers in the same manner as the molybdenum compounds. In particular, potassium carbonate, potassium hydrogen carbonate, potassium oxide, potassium hydroxide, potassium chloride, potassium sulfate, and potassium molybdate are used preferably, and potassium carbonate, potassium hydrogen carbonate, potassium chloride, potassium sulfate, and potassium molybdate are used more preferably.

The above-described potassium compounds may be used alone, or at least two types may be used in combination.

In addition, in the same manner as the above description, potassium molybdate contains molybdenum and, therefore, may have functions as the molybdenum compound. In the manufacturing method according to the embodiment, using potassium molybdate as a flux agent corresponds to using a molybdenum compound and a potassium compound as a flux agent.

Regarding the potassium compound that is used when the raw materials are charged or that is generated by a reaction during a temperature increase process of calcination, a water-soluble potassium compound, for example, potassium molybdate, is not vaporized even in the calcination temperature range and can readily be recovered by washing after the calcination. As a result, the amount of the molybdenum compound released outside a calcination furnace is reduced, and the production cost can be reduced to a great extent.

The molar ratio (molybdenum element/potassium element) of the molybdenum element in the molybdenum compound to the potassium element in the potassium compound is preferably 5 or less and more preferably 0.01 to 3. Because the production cost can be still more reduced, 0.5 to 1.5 is further preferable. The molar ratio (molybdenum element/potassium element) being within the above-described range is preferable because the plate-like alumina particle having a large particle size can be obtained.

(Silicon or Silicon Compound)

There is no particular limitation regarding the silicon or silicon compound containing a silicon element, and known materials can be used. Specific examples of the silicon or silicon compound include artificial synthetic silicon compounds, for example, a silicon metal, an organic silane, a silicon resin, silica fine particles, silica gel, mesoporous silica, SiC, and mullite; and natural silicon compounds, for example, biosilica. In particular, preferably, an organic silane, a silicon resin, and silica fine particles are used from the viewpoint of performing more uniform combination or mixing with the aluminum compound. In this regard, the silicon or silicon compounds may be used alone, or at least two types may be used in combination.

The rate of the silicon compound added relative to the aluminum compound is preferably 0.01% to 1% by mass and more preferably 0.03% to 0.4% by mass. The rate of the silicon compound added being within the above-described range is preferable because the plate-like alumina particle having a large thickness and excellent brilliance can be obtained.

The molar ratio (silicon element/aluminum element) of the silicon or the silicon element in the silicon compound to the aluminum element in the aluminum compound is preferably 0.0001 to 0.01, more preferably 0.0002 to 0.005, and further preferably 0.0003 to 0.003. The molar ratio (molybdenum element/potassium element) being within the above-described range is preferable because the plate-like alumina particle having a large particle size can be obtained.

There is no particular limitation regarding the shape of the silicon or silicon compound containing a silicon element, and any one of a spherical structure, an amorphous structure, a structure having an aspect (for example, wire, fiber, ribbon, or tube), a sheet, and the like is suitable for use.

(Shape Controlling Agent other than Silicon or Silicon Compound)

In the plate-like alumina particle according to the embodiment, as long as the formation of flat plate-like alumina is not inhibited by containing a silicon element and/or an inorganic silicon compound, a shape controlling agent other than silicon or silicon compound may be used to adjust fluidity, dispersibility, mechanical strength, an average particle diameter or an aspect ratio of the plate-like alumina, and the like as the situation demands. The shape controlling agent other than silicon and silicon compound contributes to growth a plate-like crystal of alumina in the calcination of the alumina compound in the presence of the molybdenum compound similarly to the silicon or silicon compound.

There is no particular limitation regarding the present state of the shape controlling agent other than the silicon or silicon compound as long as contact with the aluminum compound can be made. For example, a physical mixture of a shape controlling agent and an aluminum compound, a composite in which a shape controlling agent is present uniformly or locally on the surface or inside of an aluminum compound, and the like are suitable for use.

In addition, the shape controlling agent other than the silicon or silicon compound may be added in the aluminum compound arbitrarily, or may be added in the aluminum compound as an impurity.

There is no particular limitation regarding the addition method of the shape controlling agent other than the silicon or silicon compound, and a dry blending method in which the shape controlling agent is directly added and mixed as powder or a method of adding the shape controlling agent by mixing using a mixer or dispersing the shape controlling agent into a solvent, a monomer, or the like in advance may be used.

There is no particular limitation regarding the type of the shape controlling agent other than the silicon or silicon compound, similarly to the silicon or silicon compound, as long as a plate-like shape can be formed by a method including a process of subjecting molybdenum oxide to a reaction with the aluminum compound and decomposition in the presence of the molybdenum compound during the high-temperature calcination and causing a difference in the growth rate of each crystal orientation of alumina to form a crystal having different crystal habit. It is preferable to use a metal compound other than the molybdenum compound and the aluminum compound because the aspect ratio of the flat plate-like alumina is higher, fluidity or dispersibility of the alumina particle is more excellent, and productivity is more excellent. Alternatively, it is preferable to use a sodium element and/or a sodium compound.

There is no particular limitation regarding the sodium element and/or the sodium compound, and known materials can be used. Specific examples of the sodium element and/or the sodium compound include sodium carbonate, sodium molybdate, sodium oxide, sodium sulfate, sodium hydroxide, sodium nitrate, sodium chloride, and a sodium metal. Among them, sodium carbonate, sodium molybdate, sodium oxide, and sodium sulfate are preferably used from the viewpoint of industrially easy availability and easy handling. The sodium or compounds containing a sodium element may be used alone, or at least two types may be used in combination.

There is no particular limitation regarding the shape of the sodium element and/or the sodium compound, and any one of a spherical structure, an amorphous structure, a structure having an aspect (for example, wire, fiber, ribbon, or tube), a sheet, and the like is suitable for use.

There is no particular limitation regarding the amount of the sodium element and/or the sodium compound used. Preferably, the amount as a sodium metal is 0.0001 to 2 mol and more preferably 0.001 to 1 mol relative to 1 mol of an aluminum metal in the aluminum compound. The amount of the sodium element and/or the sodium compound used being within the above-described range is preferable because an alumina particle having a high aspect ratio can be easily obtained.

(Metal Compound)

The metal compound can have a function of facilitating crystal growth of alumina, as described later. The metal compound may be used in the calcination, as the situation demands In this regard, the metal compound has a function of facilitating crystal growth of α-alumina and, therefore, is not indispensable for manufacturing the plate-like alumina particle according to the present invention.

There is no particular limitation regarding the metal compound, and it is preferable that the metal compound contain at least one selected from a group consisting of metal compounds of group II and metal compounds of group III.

Examples of the metal compounds of group II include a magnesium compound, a calcium compound, a strontium compound, and a barium compound.

Examples of the metal compounds of group Ill include a scandium compound, an yttrium compound, a lanthanum compound, and a cerium compound.

The above-described metal compound refers to an oxide, a hydroxide, a carbonate, or a chloride of a metal element. Examples of the yttrium compound include yttrium oxide ($Y_2O_3$), yttrium hydroxide, and yttrium carbonate. In particular, it is preferable that the metal compound be an oxide of a metal element. These metal compounds include isomers.

In particular, metal compounds of period 3 elements, metal compounds of period 4 elements, metal compounds of period 5 elements, or metal compounds of period 6 elements are preferable, metal compounds of period 4 elements or metal compounds of period 5 elements are more preferable, and metal compounds of period 5 elements are further preferable. Specifically, it is preferable that the magnesium compound, the calcium compound, the yttrium compound, and the lanthanum compound be used, it is more preferable that the magnesium compound, the calcium compound, and the yttrium compound be used, and it is particularly preferable that the yttrium compound be used.

Metal compounds of period 4 elements are preferable from the viewpoint of also serving as a coloring component described later.

The rate of the metal compound added relative to the aluminum compound is preferably 0.02% to 20% by mass and more preferably 0.1% to 20% by mass. The rate of the metal compound added being 0.02% by mass or more is preferable because crystal growth of a-alumina containing molybdenum advances favorably. Meanwhile, the rate of the metal compound added being 20% by mass or less is preferable because the plate-like alumina particle having a low content of impurities derived from the metal compound can be obtained.

Yttrium

When the aluminum compound is fired in the presence of the yttrium compound serving as the metal compound, crystal growth advances more favorably during the calcination step so as to generate an yttrium compound inside and on the surface of α-alumina crystal. At this time, the yttrium compound present on the surface of the α-alumina that is the plate-like alumina particle can be removed from surface of the plate-like alumina particle by performing washing by water, alkaline water, warmed liquids of these, or the like (for example, separating the yttrium compound and performing decantation), if necessary.

(Coloring Component)

A coloring component has a function of changing a color of an aluminum oxide crystal by being added.

As the coloring component, a component in which at least a part of the element is incorporated into the alumina particle by the calcination step is preferable. From such a viewpoint, a material containing at least one transition metal belonging to period 4 can be used as a raw material of the coloring component. Specifically, a chromium compound, an iron compound, a titanium compound, a nickel compound, a vanadium compound, a cobalt compound, and the like can be used and examples thereof include oxides, hydroxides, metals, metal salts, fluorides, nitrates, sulfates, and chlorides of the compounds. At least two types of these can be used in combination.

There is no limitation regarding the amount of the coloring component used. The molar ratio (coloring component element/aluminum element) of the coloring component element in the coloring component to the aluminum element in the aluminum compound in the mixture is preferably 0.0001 to 0.1 and more preferably 0.0005 to 0.05. The plate-like alumina particle having the rate of the coloring component added within the above-described range is preferable because more excellent color development is obtained. The above-described molar ratio is preferably (transition metal element of period 4/aluminum element).

There is no particular limitation regarding the amounts of the aluminum compound, the molybdenum compound, the potassium compound, the silicon or silicon compound, and the coloring component used. Preferably, a mixture may be produced by mixing the aluminum compound in an amount of 10% by mass or more in terms of $Al_2O_3$, the molybdenum compound in an amount of 20% by mass or more in terms of $MoO_3$, the potassium compound in an amount of 1% by mass or more in terms of K2O, the silicon or silicon compound in an amount of less than 1% by mass in terms of $SiO_2$, and the coloring component, wherein the total amount of the raw materials is defined to be 100% by mass in terms of oxides, and the resulting mixture may be fired.

More preferably, a mixture may be produced by mixing the aluminum compound in an amount of 20% by mass or more and 70% by mass or less in terms of $Al_2O_3$, the molybdenum compound in an amount of 30% by mass or more and 80% by mass or less in terms of $MoO_3$, the potassium compound in an amount of 5% by mass or more and 30% by mass or less in terms of $K_2O$, the silicon or silicon compound in an amount of 0.001% by mass or more and 0.3% by mass or less in terms of $SiO_2$, and the coloring component, where the total amount of the raw materials is defined to be 100% by mass in terms of oxides, and the resulting mixture may be fired because the content of hexagonal-plate-like alumina can be further increased. Further preferably, a mixture may be produced by mixing the aluminum compound of 25% by mass or more and 60% by mass or less in the form of $Al_2O_3$, the molybdenum compound of 35% by mass or more and 70% by mass or less in the form of $MoO_3$, the potassium compound of 10% by mass or more and 20% by mass or less in the form of $K_2O$, the silicon or silicon compound of 0.01% by mass or more and 0.1% by mass or less in the form of $SiO_2$, and the coloring component, where the total amount of the raw materials is assumed to be 100% by mass in the forms of oxides, and the resulting mixture may be fired. Particularly preferably, a mixture may be produced by mixing the aluminum compound of 35% by mass or more and 50% by mass or less in the form of $Al_2O_3$, the molybdenum compound of 35% by mass or more and 65% by mass or less in the form of $MoO_3$, the potassium compound of 10% by mass or more and 20% by mass or less in the form of $K_2O$, the silicon or silicon compound of 0.02% by mass or more and 0.08% by mass or less in the form of $SiO_2$, and the coloring component, where the total amount of the raw materials is assumed to be 100% by mass in the forms of oxides, and the resulting mixture may be fired because the content of hexagonal-plate-like alumina can be increased to the maximum and crystal growth advances more favorably.

The plate-like alumina particle having a plate-like form and a large particle size and more excellent brilliance can be manufactured by mixing various compounds within the above-described ranges. In particular, tendencies to increase the amount of molybdenum used and to decrease the amount of silicon used to some extent can increase the particle size and the crystallite diameter and the hexagonal-plate-like alumina particle is readily obtained. When various compounds are mixed within the above-described further preferable ranges, the hexagonal-plate-like alumina particle is readily obtained, the content of the hexagonal-plate-like alumina particle can be increased, and the resulting alumina particle tends to have further excellent brilliance.

There is no particular limitation regarding the amount of the coloring component used. Preferably, the coloring component of 0.005% by mass or more in the form of oxide may be mixed into the mixture, where the total amount of the raw materials is assumed to be 100% by mass in the forms of oxides, the coloring component of 0.05 by mass or more and 5% by mass or less in the form of oxide may be mixed into the mixture, or the coloring component of 0.1% by mass or more and 3% by mass or less in the form of oxide may be mixed into the mixture. The resulting alumina particle tends to have further excellent color development by mixing a coloring component within the above-described range.

When the above-described mixture further includes the yttrium compound, there is no particular limitation regarding the amount of the yttrium compound used. Preferably, the yttrium compound of 5% by mass or less in the form of $Y_2O_3$ may be mixed, where the total amount of the raw materials is assumed to be 100% by mass in the forms of oxides. More preferably, the yttrium compound of 0.01% by mass or more and 3% by mass or less in the form of $Y_2O_3$ may be mixed, where the total amount of the raw materials is assumed to be 100% by mass in the forms of oxides. Further preferably, the yttrium compound of 0.1% by mass or more and 1% by mass or less in the form of $Y_2O_3$ may be mixed, where the total amount of the raw materials is assumed to be 100% by mass in the forms of oxides, because crystal growth advances more favorably.

The above-described aluminum compound, molybdenum compound, potassium compound, silicon or silicon compound, coloring component, and metal compound are used such that the total amount of use does not exceed 100% by mass in the forms of oxides.

[Calcination Step]

The calcination step according to the embodiment includes a step (first calcination step) of calcining the aluminum compound in the presence of the molybdenum compound, the silicon or silicon compound, and the coloring component. The first calcination step may be a step of calcining the mixture obtained in the mixing step.

In the manufacturing method according to the present embodiment, it is preferable to include a second calcination step of taking out a plate-like alumina particle from the mixture after calcining in the first calcination step and further calcining the plate-like alumina particle. The second calcination step will be described later.

(First Calcination Step)

The first calcination step will be described below.

The plate-like alumina particle according to the embodiment is obtained by, for example, calcining the aluminum compound in the presence of the molybdenum compound, the potassium compound, the silicon or silicon compound, and the coloring component. As described above, this manufacturing method is called the flux method.

The flux method is classified in a solution method. In more detail, the flux method is a method for growing a crystal by utilizing a crystal-flux binary phase diagram showing a eutectic type. The mechanism of the flux method is conjectured to be as described below. That is, when a mixture of a solute and a flux is heated, the solute and the flux become a liquid phase. At this time, the flux is a fusing agent, in other words, the solute-flux binary phase diagram shows a eutectic type, and therefore, the solute is fused at a temperature lower than the melting temperature of the solute so as to constitute the liquid phase. When the flux in this state is vaporized, the concentration of the flux decreases, in other words, the effect of decreasing the melting temperature of the solute due to the flux is reduced, and crystal growth of the solute occurs because vaporization of the flux serves as a driving force (flux vaporization method). A method of growing a crystal in a liquid phase flux agent is also a preferred method, and the solute and the flux can also cause crystal growth of the solute by cooling the liquid phase (slow cooling method).

The flux method has advantages of causing crystal growth at a temperature much lower than the melting temperature, controlling the crystal structure precisely, and forming a euhedral polyhedral crystal.

Regarding manufacturing of the alumina particle by the flux method in which the molybdenum compound is used as the flux, although the mechanism is not obvious, it is conjectured that the mechanism is, for example, as described below. That is, when the aluminum compound is fired in the presence of the molybdenum compound, aluminum molybdate is formed at first. As is clear from the above description, the aluminum molybdate grows an alumina crystal at a temperature lower than the melting temperature of alumina. Subsequently, the alumina particle can be obtained by accelerating crystal growth through decomposition of aluminum molybdate, vaporization of flux, and the like. That is, the molybdenum compound serves as the flux, and the alumina particle is manufactured via aluminum molybdate serving as an intermediate.

In this regard, the plate-like alumina particle having a large particle size can be manufactured by using the potassium compound and the silicon or silicon compound in combination in the flux method. In more detail, when the molybdenum compound and the potassium compound is used in combination, initially, potassium molybdate is formed by a reaction between the molybdenum compound and the potassium compound. At the same time, aluminum molybdate is formed by a reaction between the molybdenum compound and the aluminum compound. Subsequently, for example, aluminum molybdate is decomposed in the presence of potassium molybdate, crystal growth occurs in the presence of the silicon or silicon compound and, thereby, the plate-like alumina particle having a large particle size can be produced. That is, when potassium molybdate is present in manufacturing of the alumina particle via aluminum molybdate serving as an intermediate, the alumina particle having a large particle size can be manufactured.

Consequently, although the reason is not obvious, when the alumina particle is obtained based on aluminum molybdate in the presence of potassium molybdate, the alumina particle having a large particle size can be obtained compared with the case in which the alumina particle is obtained based on aluminum molybdate.

Meanwhile, the silicon or silicon compound serving as a shape controlling agent plays an important role in growing a plate-like crystal. In generally performed molybdenum oxide flux method, molybdenum oxide reacts with the aluminum compound to form aluminum molybdate, and then the change in chemical potential in the process of decomposition of the aluminum molybdate serves as a driving force for crystallization. Therefore, an idiomorphic face (113) is developed and hexagonal bipyramidal type polyhedral particle is formed. In the manufacturing method according to the embodiment, the growth of the idiomorphic face (113) is significantly inhibited by the localization of the silicon or silicon compound in the vicinity of the particle surface in the α-alumina growth process. As a result, it is considered that the growth of the crystal orientation in the plane direction becomes relatively fast and a (006) face can grow to form a plate-like shape.

In this regard, the above-described mechanism is based on conjecture, and even the case in which the effect of the present invention is obtained based on a mechanism different from the above-described mechanism is included in the technical scope of the present invention.

There is no particular limitation regarding the configuration of the potassium molybdate, and usually a molybdenum atom, a potassium atom, and an oxygen atom are included. Preferably, the structural formula is represented by $K_2Mo_nO_{3n+1}$. In this regard, there is no particular limitation regarding n, and the range of 1 to 3 is preferable because facilitation of growth of an alumina particle functions effectively. Potassium molybdate may contain other atoms, and examples of the other atoms include sodium, magnesium, and silicon.

In the first calcination step, the above-described calcination may be performed in the presence of the metal compound. For example, in the calcination, the above-described metal compound may be used in combination with the molybdenum compound and the potassium compound. Consequently, the alumina particle having a larger particle size can be manufactured. Although the mechanism is not obvious, it is conjectured that the mechanism is, for example, as described below. That is, it is considered that when the metal compound is present during crystal growth of the alumina particle, a function of preventing or suppressing formation of alumina crystal nuclei and/or facilitating diffusion of the aluminum compound necessary for crystal growth of alumina, in other words, a function of preventing excessive generation of crystal nuclei and/or increasing the diffusion rate of the aluminum compound is performed, and the alumina particle having a large particle size is obtained. In this regard, the above-described mechanism is based on conjecture, and even the case in which the effect of the present invention is obtained based on a mechanism different from the above-described mechanism is included in the technical scope of the present invention.

There is no particular limitation regarding the calcination temperature in the first calcination step, and the maximum calcination temperature is preferably 700° C. or higher, more preferably 900° C. or higher, further preferably 900° C. to 2,000° C., and particularly preferably 900° C. to 1,200° C. The calcination temperature being 700° C. or higher is preferable because a flux reaction advances favorably, and the calcination temperature being 900° C. or higher is more preferable because a plate-like crystal growth of the alumina particle advances favorably.

There is no particular limitation regarding the states of the aluminum compound, the molybdenum compound, the potassium compound, the silicon or silicon compound, the metal compound, and the like at the time of calcining in the first calcination step as long as these are mixed. Examples of the mixing method include simple mixing so as to mix powders, mechanical mixing by using a grinder, a mixer, or the like, and mixing by using a mortar or the like. At this time, the resulting mixture may be in any one of a dry state and a wet state, and a dry state is preferable from the viewpoint of cost.

There is no particular limitation regarding the calcination time in the first calcination step, and 0.1 to 1,000 hours is preferable. From the viewpoint of efficiently forming the alumina particle, 1 to 100 hours is more preferable. The calcination time of 0.1 hours or more is preferable because the alumina particle having a large particle size can be obtained. Meanwhile, the calcination time of 1,000 hours or less is preferable because the production cost can be reduced.

There is no particular limitation regarding the temperature increasing rate up to the calcination temperature in the first calcination step, and 1° C./hour to 1,000° C./hour is preferable, 5° C./hour to 500° C./hour is more preferable, and 50° C./hour to 300° C./hour is further preferable. The temperature increasing rate being the above-described lower limit or more is preferable because the production time is reduced. Meanwhile, the temperature increasing rate being the above-described upper limit or less is preferable because the crystal growth efficiency of the alumina particle is appropriately improved.

There is no particular limitation regarding the atmosphere of calcining in the first calcination step. For example, an oxygen-containing atmosphere such as air or oxygen and an inert atmosphere such as nitrogen or argon are preferable, an oxygen-containing atmosphere and a nitrogen atmosphere having no corrosivity are more preferable from the viewpoint of the safety of an operator and the durability of a furnace, and an air atmosphere is further preferable from the viewpoint of cost.

There is no particular limitation regarding the calcination pressure in the first calcination step, and the calcination may be performed under normal pressure, under pressure, or under reduced pressure. There is no particular limitation regarding heating means, and it is preferable that a calcination furnace be used. At this time, examples of the usable calcination furnace include a tunnel furnace, a roller-hearth furnace, a rotary kiln, and a muffle furnace.

[Cooling Step]

The manufacturing method according to the present invention may include a cooling step. The cooling step is a step of cooling the alumina crystal grown in the calcination step.

There is no particular limitation regarding the cooling rate, and 1° C./hour to 1,000° C./hour is preferable, 5° C./hour to 500° C./hour is more preferable, and 50° C./hour to 300° C./hour is further preferable. The cooling rate being 1° C./hour or more is preferable because the production time is reduced. Meanwhile, the cooling rate being 1,000° C./hour or less is preferable because a calcination container does not frequently crack due to heat shock and can be used for a long time.

There is no particular limitation regarding the cooling method, and natural cooling may be adopted or a cooling device may be used.

[Posttreatment Step]

The manufacturing method according to the present invention may include a posttreatment step. The posttreatment step is a step of separating the plate-like alumina particle and the flux agent to remove the flux agent from the plate-like alumina particle.

By the operation of the posttreatment step, the shape controlling agent, components derived therefrom, and the like can be removed from the plate-like alumina particle in addition to the flux agent. The posttreatment step may be performed after the calcination step, performed after the cooling step, or performed after the calcination step and the cooling step. As the situation demands, the posttreatment step may be repeated at least two times.

An example of the posttreatment method includes washing. These may be performed in combination.

There is no particular limitation regarding the washing method, and examples of the washing method include washing with water, an ammonia aqueous solution, a sodium hydroxide aqueous solution, or an acidic aqueous solution.

By the operation of washing, at least a part of the flux agent, the shape controlling agent, and the components derived therefrom can be removed from the surface of the plate-like alumina particle.

At this time, the molybdenum content, for example, contained in the plate-like alumina particle can be controlled by appropriately changing the concentration and the amount of the water, an ammonia aqueous solution, a sodium hydroxide aqueous solution, an acidic aqueous solution, or the like used in the washing, the washing area, the washing time, and the like. Molybdenum that is derived from the flux agent and does not form a chemical bond with Al which is present on the surface of the plate-like alumina particle is easily removed from the surface of the plate-like alumina particle.

Regarding the behavior of components other than molybdenum in the washing, for example, a silicon compound which is derived from the shape controlling agent and contained in the plate-like alumina particle is insoluble in water. Therefore, silicon is difficult to be dissolved and removed from the surface of the plate-like alumina particle. In addition, in a case in which a sodium compound is used as a shape controlling agent or a case in which a potassium compound is used as a flux agent, the potassium compound and the sodium compound which are derived therefrom and present on the surface of the plate-like alumina particle are water-soluble compounds. Therefore, potassium and sodium are easily dissolved and removed from the surface of the plate-like alumina particle.

(Second Calcination Step)

The second calcination step is a step of taking out a plate-like alumina particle from the mixture after calcining in the first calcination step and further calcining the plate-like alumina particle. The operation of taking out the plate-like alumina particle from the mixture after calcining means an operation of removing the flux agent around the alumina particle, and the operation can be performed by the operation exemplified in the above-described posttreatment step. In the posttreatment step, the flux agent may not be completely removed from the alumina particle.

The flux agent can be further removed from the plate-like alumina particle by the second calcination step.

By taking out the plate-like alumina particle in advance from the mixture after calcining in the first calcination step, the plate-like alumina particle can be separated from a large amount of the flux agent and the removal efficiency of the flux agent in the second calcination step is enhanced.

Preferably, the second calcination step is performed after the above-described washing of the plate-like alumina particle. It is conjectured that the flux agent, the shape controlling agent, and components derived therefrom are removed in advance from the surface of the plate-like alumina particle by the washing and the removal efficiency thereof in the second calcination step is further enhanced.

The components which are derived from the flux agent or the like, present on the "surface" of the plate-like alumina particle, and does not form a chemical bond with Al can be removed by the above-described taking out or washing. However, it is considered that, by performing the second calcination step, components (for example, molybdenum) which are derived from the flux agent or the like and contained "inside" of the plate-like alumina particle are released from inside of the plate-like alumina particle by atomic exchange in the local solid solution state of the plate-like alumina particle or the like. Therefore, the color development of the plate-like alumina particle can be made brighter through the second calcination step.

Examples of the conditions such as the calcination temperature, the calcination time, the atmosphere of calcination, and the calcination pressure in the second calcination step include the conditions exemplified in the first calcination step, and the treatment conditions can be appropriately selected so as to obtain a desired color development.

For example, the calcination temperature in the second calcination step is preferably 900° C. to 2,000° C. and more preferably 1,200° C. to 1,600° C. Preferably, the calcination temperature in the second calcination step is appropriately determined depending on the type of the coloring component for the purpose of preventing excessive detachment of even the coloring component by the treatment of the second calcination step. For example, in a case in which cobalt is used as the coloring component, the calcination temperature in the second calcination step is preferably 1,200° C. or lower. For example, in a case in which iron, titanium, or nickel is used as the coloring component, the calcination temperature in the second calcination step is preferably 1,400° C. or lower.

[Grinding Step]

Regarding a fired product, in some cases, aggregation of plate-like alumina particles occurs and the particle diameters do not fall within the preferable range according to the present invention. Therefore, as the situation demands, grinding may be performed such that the particle diameter of the plate-like alumina particle falls within the preferable range according to the present invention.

There is no particular limitation regarding the method for grinding the fired product, and a known grinding method in the related art, for example, a ball mill, a jaw crusher, a jet mill, a disk mill, Spectro Mill, a grinder, or a mixer mill may be applied.

[Classification Step]

Preferably, the plate-like alumina particles are subjected to classification treatment for the purpose of adjusting the average particle diameter so as to improve the fluidity of the powder or suppressing a viscosity increase when being mixed into a binder for forming a matrix. The "classification treatment" means an operation to divide particles into groups based on the size of the particle.

The classification may be any one of a wet type and a dry type, and dry type classification is preferable from the viewpoint of productivity. Examples of the dry type classification include classification by using a sieve and, in addition, wind power classification in which classification is performed by a difference between centrifugal force and fluid drag. From the viewpoint of classification precision, the wind power classification is preferable and can be performed by using a classifier, for example, a pneumatic classifier by utilizing the Coanda effect, a circular airflow type classifier, a forced vortex centrifugal classifier, or a semi-free vortex centrifugal classifier.

The grinding step and the classification step may be performed at any stage, as the situation demands, that may be before or after an organic-compound-layer-forming step as described later. For example, the average particle diameter of the resulting plate-like alumina particles can be adjusted by presence or absence of the grinding and classification and selecting the condition for these.

It is preferable that the plate-like alumina particles according to the present invention and the plate-like alumina particles obtained by the manufacturing method according to the present invention be aggregated to a less extent or not aggregated because intrinsic properties are readily exhibited, the handleability in themselves is more excellent, and when used after being dispersed in a dispersion medium, more excellent dispersibility is exhibited. Regarding the method for manufacturing the plate-like alumina particles, it is preferable that plate-like alumina particles with a less extent of aggregation or no aggregation be obtained without performing the grinding step and the classification step because plate-like alumina having target excellent properties can be produced with high productivity without performing the above-described steps.

[Organic-Compound-Layer-Forming Step]

In an embodiment, the method for manufacturing the plate-like alumina particles may further include the organic-compound-layer-forming step. The organic-compound-layer-forming step is usually performed after the calcination step or after the molybdenum removal step.

There is no particular limitation regarding the method for forming the organic compound layer, and a known method may be appropriately adopted. For example, a method in which a liquid containing the organic compound is brought into contact with plate-like alumina particles containing molybdenum and drying is performed is adopted.

In this regard, the above-described organic compounds are used as the organic compound used for forming the organic compound layer.

EXAMPLES

Next, the present invention will be described in further detail with reference to the examples, but the present invention is not limited to the following examples.

<<Evaluation>>

Samples of the following alumina particles manufactured in Examples 1 to 6 and Comparative examples 1 and 2 were subjected to the following evaluations. The measuring methods are as described below.

[Measurement of Major Axis L of Plate-Like Alumina]

The prepared samples were placed on a slide glass and observed with a digital microscope (VHX-6000, produced by KEYENCE CORPORATION), major axes of 50 particles were measured, and the average value was assumed to be the major axis L (μm).

[Measurement of Thickness D of Plate-Like Alumina]

The prepared samples were placed on a slide glass and observed with a digital microscope (VHX-6000, produced by KEYENCE CORPORATION), thicknesses of 50 particles were measured, and the average value was assumed to be the thickness D (μm).

[Aspect Ratio L/D]

The aspect ratio was determined by using the following formula.

Aspect ratio=(major axis L of plate-like alumina)/(thickness D of plate-like alumina)

[Evaluation of Shape of Plate-Like Alumina]

The shapes of alumina particles were examined based on the images obtained by using a digital microscope. The case in which 5% or more of hexagonal-plate-like particles in number were observed, where the total number of alumina particles with the shapes examined were assumed to be 100%, was rated that hexagonal-plate-like alumina particles were "present".

[Elemental Analysis by X-Ray Fluorescence Measurement (XRF)]

Approximately 70 mg of the prepared sample was placed on filter paper and covered with a PP film, and composition analysis was performed by using X-ray fluorescence analysis apparatus [ZSX Primus IV, produced by Rigaku Corporation]. The amounts of silicon, molybdenum, potassium, and a coloring component determined from the result of XRF analysis were respectively converted to silicon dioxide (% by mass), molybdenum trioxide (% by mass), potassium oxide (% by mass), and a coloring component element (% by mass) relative to 100% by mass of the plate-like alumina particle.

[Surface Elemental Analysis by X-Ray Photoelectron Spectroscopy (XPS)]

The prepared sample was press-fixed on a double-faced tape, and composition analysis was performed under the conditions described below by using an X-ray photoelectron spectroscopy (XPS) apparatus Quantera SNM (ULVAC-PHI, Inc.).

X-ray source: monochromatic AlKα, beam diameter of 100 μmφ, and output of 25 W

Measurement: area measurement (1,000 μm square) and n=3

Charge correction: C1s=284.8 eV

The amount of Si in the plate-like alumina particle surface layer was assumed to be [Si]/[Al] determined from the result of XPS analysis.

[Analysis of Crystal Structure and α-Crystal Ratio by X-Ray Diffraction Method (XRD)]

The prepared sample was placed on a measurement sample holder having a depth of 0.5 mm so as to be flattened with a predetermined load, the resulting holder was set into a wide-angle X-ray diffraction apparatus (Rint-Ultma produced by Rigaku Corporation), and measurement was performed under the conditions of Cu/Kα rays, 40 kV/30 mA, scan speed of 2 degrees/min, and a scanning range of 10 to 70 degrees. The α-crystal ratio was determined from the ratio of the most intense peak height of α-alumina to transition alumina.

[Analysis of Crystallite Diameter by X-Ray Diffraction Method (XRD)]

Measurement was performed by using SmartLab (produced by Rigaku Corporation) serving as an X-ray diffraction apparatus, using a high-intensity high-resolution crystal analyzer (CALSA) serving as a detector, and using PDXL serving as analysis software. At this time, the measuring method was the 2θ/θ method, and regarding the analysis of crystallite diameter, calculation was performed, by using Scheirer equation, based on the full-widths at half-maximum of peaks that appeared at approximately 2θ=35.2° ([104] face) and approximately 2θ=43.4° ([113] face). Regarding the measurement conditions, the scan speed was 0.05°/min, the scan range was 5° to 70°, the step was 0.002°, and the apparatus standard width was 0.027° (Si).

[Single Crystal Measurement]

Structural analysis of plate-like α-alumina was performed by using a single crystal X-ray diffractometer for chemical crystallography XtaLab P200 (produced by Rigaku Corporation). The measurement conditions and various types of software used for analysis are as described below.

Apparatus: XtaLab P200 produced by Rigaku Corporation (detector: PIRATUS 200K)

Measurement conditions: radiation source of Mo Kα (λ=0.7107 angstrom)

X-ray output: 50 kV–24 mA blowing gas: $N_2$, 25° C.

camera length: 30 mm

Measurement software: CrystalClear

Image processing software: CrysAlis Pro

Structural analysis software: olex2, SHELX

One plate-like alumina particle was taken out from aggregation of a plurality of prepared crystals, the particle was analyzed with a single crystal X-ray diffractometer for chemical crystallography, and, thereby, single crystal structure analysis could be performed. Furthermore, several particles were taken out, the shapes thereof were observed with a scanning electron microscope (SEM), and, thereby, a sample identified that no other crystal was attached around the particle (no twin crystal was found) was rated that a single crystal was "present".

[Spectrophotometry]

The reflectance was measured in a specular component excluded mode (SCE method) by using a spectrocolorimeter CM-5 (produced by Konica Minolta, Inc.).

Wavelength range: 360 nm to 740 nm

Wavelength interval: 10 nm

Spectroscopic means: Planar diffraction grating

Light source for measurement: Pulsed xenon lamp

<<Manufacturing of Alumina Particle>>

Example 1

A mixture was obtained by dry mixing 120.8 g of transition alumina (containing γ-alumina as a primary component), 0.2 g of silicon dioxide (produced by KANTO CHEMICAL CO., INC., analytical grade), 109.3 g of molybdenum trioxide (produced by TAIYO KOKO CO., LTD.), 52.5 g of potassium carbonate (produced by KANTO CHEMICAL CO., INC., Cica first grade), 0.6 g of sodium carbonate (produced by KANTO CHEMICAL CO., INC., analytical grade), 0.6 g of yttrium oxide (produced by Wako Pure Chemical Corporation), and 2.7 g of chromium oxide (produced by KANTO CHEMICAL CO., INC.). The resulting mixture was placed into a sagger and calcination (first calcination) was performed in an electric muffle furnace by increasing the temperature to 1,100° C. under the condition of 3° C./min and maintaining at 1,100° C. for 24 hours. Thereafter, the temperature was decreased to room temperature under the condition of 3° C./min, and a fired product was taken out from the sagger so as to obtain 251.1 g of the fired product. The resulting fired product was roughly disintegrated in a mortar, 1,200 mL of 10% sodium hydroxide aqueous solution was added thereto, agitation at 25° C. for 0.5 hours was performed, and then filtration, washing with water, and drying were performed. Subsequently, calcination (second calcination) was further performed at 1,500° C. for 10 hours so as to obtain 118.4 g of red alumina particles.

The resulting red alumina particles were subjected to structural analysis and crystallite diameter measurement by X-ray diffraction method (XRD). As a result, it was identified that a sharp diffraction peak derived from corundum appears, the resulting red alumina particles was an alumina crystal containing a-crystal structure as a primary component, and an average crystallite diameter thereof was 373 nm from a peak attributed to the [104] face and 401 nm from a peak attributed to the [113] face. From the result of X-ray fluorescence measurement (XRF), it was identified that the resulting particles contained Mo of 0.458% by mass in the form of $MoO_3$, Si of 0.175% by mass in the form of $SiO_2$, K of 0.063% by mass in the form of $K_2O$, and Cr of 2.2% by mass relative to 100% by mass of particles. Furthermore, by X-ray photoelectron spectroscopy (XPS), it was identified that [Si]/[Al] on the surface of the alumina particle was 0.124. From the result of colorimetry using a spectrocolorimeter, it was identified that reflected light was observed at approximately 600 nm to 730 nm, and in particular, reflection was very high at approximately 700 nm. The mixing ratio of each raw material and the result of each analysis are shown in Tables 1 and 2.

TABLE 1

|  |  |  | Example | | | | | | Comparative Example | |
|---|---|---|---|---|---|---|---|---|---|---|
|  |  |  | 1 | 2 | 3 | 4 | 5 | 6 | 1 | 2 |
| Actual mixing [g] | Transition alumina | $Al_2O_3$ | 120.8 | 120.8 | 120.8 | 120.8 | 120.8 | 120.8 | 1.5 | 120.8 |
|  | Silicon dioxide | $SiO_2$ | 0.2 | 0.2 | 0.2 | 0.2 | 0.2 | 0.2 | — | 0.2 |
|  | Molybdenum trioxide | $MoO_3$ | 109.3 | 109.3 | 109.3 | 109.3 | 109.3 | 109.3 | 28.5 | 109.3 |
|  | Potassium carbonate | $K_2CO_3$ | 52.5 | 52.5 | 52.5 | 52.5 | 52.5 | 52.5 | — | 52.5 |
|  | Sodium carbonate | $Na_2CO_3$ | 0.6 | 0.6 | 0.6 | 0.6 | 0.6 | 0.6 | — | 0.6 |
|  | Yttrium oxide | $Y_2O_3$ | 0.6 | 0.6 | 0.6 | 0.6 | 0.6 | 0.6 | — | 0.6 |
|  | Lithium carbonate | $Li_2CO_3$ | — | — | — | — | — | — | 1.5 | — |
|  | Coloring component |  | 2.70 Chromium oxide | 0.27 Chromium oxide | 2.85 Cobalt oxide | 2.85 Cobalt oxide | 2.55 Iron oxide 2.83 Titanium oxide | 2.65 Nickel oxide | 0.008 Chromium oxide | — |
| Ratio | Molybdenum compound | Mo/Al molar ratio | 0.32 | 0.32 | 0.32 | 0.32 | 0.32 | 0.32 | 6.73 | 0.32 |
|  | Potassium compound | Mo/K molar ratio | 1 | 1 | 1 | 1 | 1 | 1 | — | 1 |
|  | Silicon compound | Amount added to $Al_2O_3$ (% by mass) | 0.2 | 0.2 | 0.2 | 0.2 | 0.2 | 0.2 | — | 0.2 |
|  | Yttrium compound | Amount added to $Al_2O_3$ (% by mass) | 0.5 | 0.5 | 0.5 | 0.5 | 0.5 | 0.5 |  | 0.5 |
|  | Coloring component | Coloring component element/Al molar ratio | 0.015 (Cr) | 0.0015 (Cr) | 0.015 (Co) | 0.015 (Co) | 0.015 (Fe) 0.015 (Ti) | 0.015 (Ni) | 0.0036 (Cr) | — |
| Calcination temperature [° C.] | First calcination |  | 1100 | 1100 | 1100 | 1100 | 1100 | 1100 | 1100 | 1100 |
|  | Second calcination |  | 1500 | 1500 | 1100 | 1500 | 1300 | 1300 | — | 1500 |

Example 2 to 6

Plate-like alumina particles exhibiting each color were manufactured in the same manner as Example 1 described above except that the type and the amount of the coloring component mixed and the temperature of second calcination in Example 1 were changed as shown in Table 1. The mixing ratio of each raw material and the result of each analysis are shown in Tables 1 and 2.

Comparative Example 1

A mixture was obtained by mixing 1.5 g of aluminum oxide, 0.008 g of chromium oxide, 28.5 g of molybdenum oxide, and 1.5 g of lithium carbonate in a mortar. A platinum crucible was charged with the resulting mixture and covered with a lid, and calcination was performed in an electric furnace at the temperature increasing rate of 45° C./h at 1,100° C. for 5 hours. After calcination, the crucible was put into warm water so as to separate and recover the chromium-added artificial corundum crystal. The resulting crystals had a red hexagonally dipyramidal shape and plate-like particles were not obtained. The mixing ratio of each raw material and the result of each analysis are shown in Tables 1 and 2.

Comparative Example 2

The synthesis was performed in the same manner as in Example 1 except that chromium oxide was not used to obtain 115.5 g of light gray alumina particles.

From the result of colorimetry using a spectrocolorimeter, a spectrum close to total reflection was observed in the measured range of 360 nm to 740 nm and a clear peak was not observed. The mixing ratio of each raw material and the result of each analysis are shown in Tables 1 and 2.

The mixing ratio of the raw material compounds in the forms of oxides (the total was set to be 100% by mass) and results of the evaluation are shown in Table 2.

TABLE 2

|  |  | Example | | | | | | Comparative Example | |
|---|---|---|---|---|---|---|---|---|---|
|  |  | 1 | 2 | 3 | 4 | 5 | 6 | 1 | 2 |
| Relative amount (in form of oxide) [% by mass] | $Al_2O_3$ | 44.8 | 45.2 | 44.7 | 44.7 | 44.3 | 44.8 | 4.9 | 45.2 |
|  | $SiO_2$ | 0.074 | 0.075 | 0.074 | 0.074 | 0.073 | 0.074 | — | 0.075 |
|  | $MoO_3$ | 40.5 | 40.9 | 40.5 | 40.5 | 40.1 | 40.5 | 93.4 | 40.9 |
|  | $K_2O$ | 13.3 | 13.4 | 13.3 | 13.3 | 13.1 | 13.3 | — | 13.4 |
|  | $Na_2O$ | 13.3 | 13.4 | 13.3 | 13.3 | 13.1 | 13.3 | — | 13.4 |
|  | $Y_2O_3$ | 0.22 | 0.22 | 0.22 | 0.22 | 0.22 | 0.22 | — | 0.22 |
|  | $Li_2O$ | — | — | — | — | — | — | 1.64 | — |
|  | Coloring component | 1.0 Chromium oxide | 0.1 Chromium oxide | 1.06 Cobalt oxide | 1.06 Cobalt oxide | 0.94 Iron oxide 1.04 Titanium oxide | 0.98 Nickel oxide | 0.03 Chromium oxide | — |

TABLE 2-continued

|  | Example | | | | | | Comparative Example | |
|---|---|---|---|---|---|---|---|---|
|  | 1 | 2 | 3 | 4 | 5 | 6 | 1 | 2 |
| Color (visual observation) | Red | Pink | Blue | Blue | Blue | Green | Red | Light gray |
| Shape | Plate-like shape | Plate-like shape | Plate-like shape | Plate-like shape | Plate-like shape | Plate-like shape | Hexagonally dipyramidal shape | Plate-like shape |
| L [μm] | 80 | 80 | 36 | 40 | 74 | 71 | — | 80 |
| D [μm] | 10 | 8 | 6 | 6 | 8 | 10 | — | 9 |
| Aspect ratio L/D | 8 | 10 | 6 | 7 | 9 | 7 | — | 9 |
| Hexagonal-plate-like shape | Present | Present | Present | Present | Present | Present | Absent | Present |
| XPS molar ratio [Si]/[Al] | 0.124 | 0.190 | 0.087 | 0.180 | 0.047 | 0.052 | <0.001 | 0.130 |
| XRF $SiO_2$ (% by mass) | 0.175 | 0.188 | 0.118 | 0.218 | 0.149 | 0.081 | — | 0.067 |
| XRF $MoO_3$ (% by mass) | 0.458 | 0.745 | 1.52 | 1.25 | 1.33 | 1.52 |  | 0.238 |
| XRF $K_2O$ (% by mass) | 0.063 | 0.154 | 0.251 | 0291 | 0.277 | 0.282 | — | 0.045 |
| XRF coloring component element (% by mass) | 2.20 Cr | 0.181 Cr | 0.732 Co | 0.592 Co | 1.386 Ti | 0.735 Ni |  | — |
| (104) face crystallite diameter [nm] | 373 | 280 | 280 | 394 | 324 | 440 |  | 820 |
| (113) face crystallite diameter [nm] | 401 | 405 | 312 | 317 | 378 | 305 |  | 827 |
| Single crystal | Present | Present | Present | Present | Present | Present | Present | Present |
| Reflected light peak top [nm] | 700 640 | 700 640 | 450 | 450 | 490 | 520 |  | *1 |
| Reflected light wavelength range of full-width at half-maximum [nm] | 690 to 710 620 to 660 | 690 to 710 620 to 660 | 380 to 520 | 380 to 520 | 420 to 520 | 460 to 560 |  | *1 |

*1: Close to total reflection and no clear peak

Figure 2:
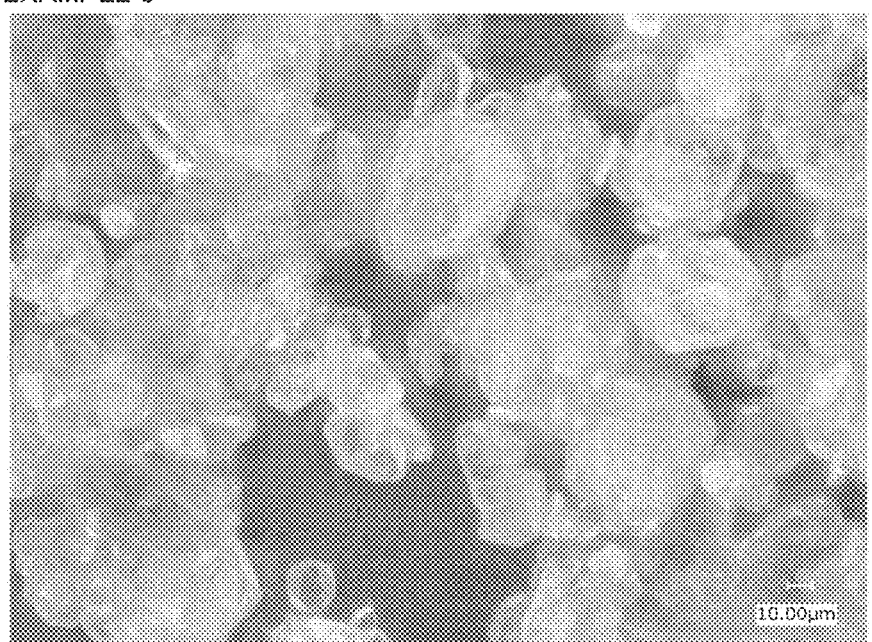
FIG. 2 is a microscope observation image of plate-like alumina particles obtained in Example 3.
Figure 3:
FIG. 3 is a microscope observation image of plate-like alumina particles obtained in Example 6.

FIG. 1 shows a microscope observation image of plate-like alumina particles in Example 1. FIG. 2 shows a microscope observation image of plate-like alumina particles in Example 3. FIG. 3 shows a microscope observation image of plate-like alumina particles in Example 6.

It was determined that the alumina particles obtained in Examples 1 to 6 and Comparative Example 2 had the colors, the shapes, the major axes, the thicknesses, the average particle diameters, and the aspect ratios described in Table 2. It was determined that the alumina particle obtained in Comparative Example 1 had the color and the shape described in Table 2.

The plate-like alumina particles in Examples 1 to 6 which were manufactured by using $SiO_2$ as a raw material had a plate-like shape having an aspect ratio of 2 or more.

In contrast, the alumina particle in Comparative Example 1 which was manufactured without mixing $SiO_2$ into a raw material had a hexagonally dipyramidal shape and did not have a plate-like structure.

The plate-like alumina particles in Examples 1 to 6 had excellent brilliance compared with the alumina particle in Comparative Example 1.

The alumina particles obtained in Examples 1 to 6 were subjected to the XRD measurement. As a result, a sharp diffraction peak attributed to a-alumina appeared, no peak of alumina crystal other than the a-crystal structure was observed, and plate-like alumina having a dense crystal structure was identified. Therefore, it was determined that the a-crystal ratios of the alumina particles obtained in Examples 1 to 6 were 99% or more and intense reflection of light was observed in contrast to the raw materials.

Furthermore, from the measurement results the average crystallite diameter of the (104) face and the crystallite diameter of the (113) face, it was determined that the alumina particles in Examples 1 to 6 had a large crystallite diameter, and the alumina particles had excellent brilliance.

Furthermore, the plate-like alumina particles obtained in Examples 1 to 6 and Comparative Examples 1 and 2 were subjected to the single crystal measurement. As a result, it was determined that single crystals were "present".

Figure 4:
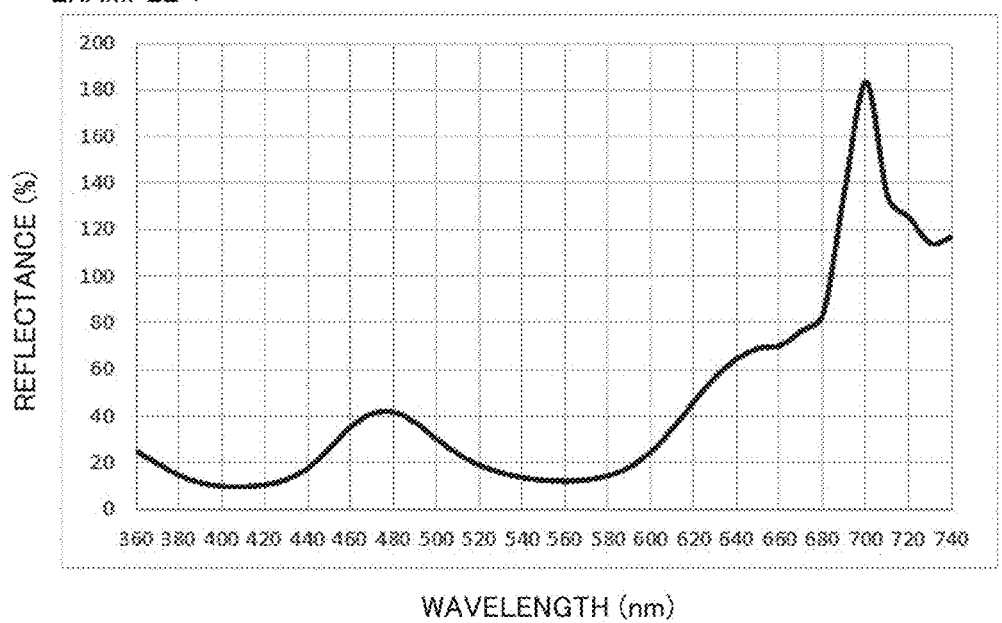
FIG. 4 is a reflectance spectral data of the plate-like alumina particles obtained in Example 1.
Figure 5:
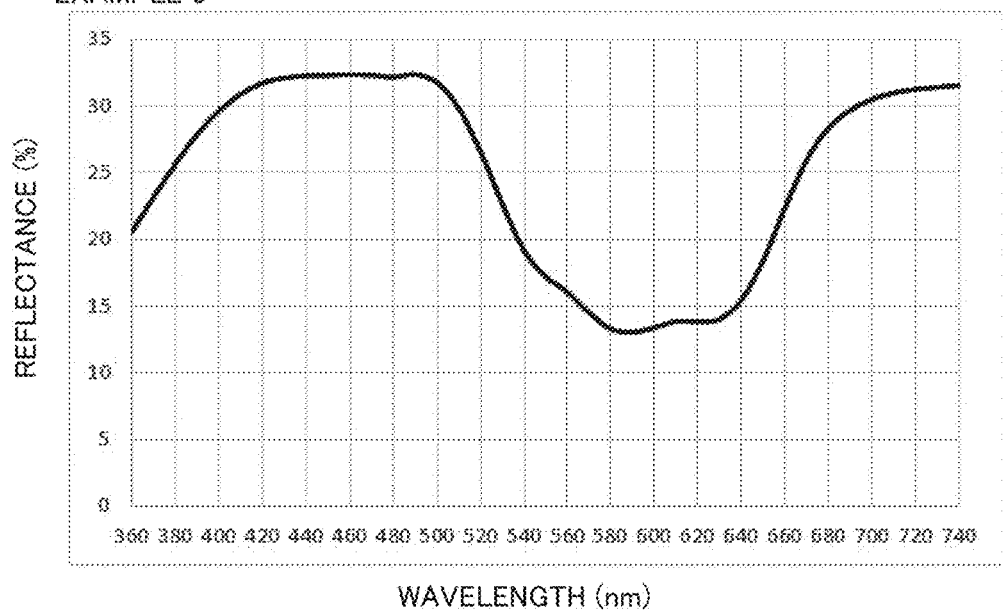
FIG. 5 is a reflectance spectral data of the plate-like alumina particles obtained in Example 3.
Figure 6:
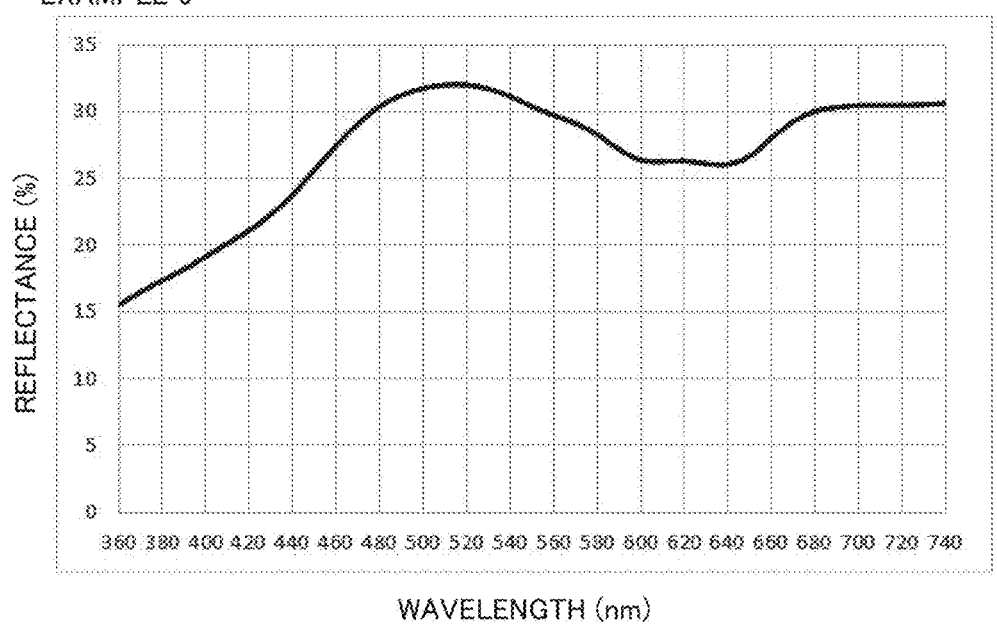
FIG. 6 is a reflectance spectral data of the plate-like alumina particles obtained in Example 6.
Figure 7:
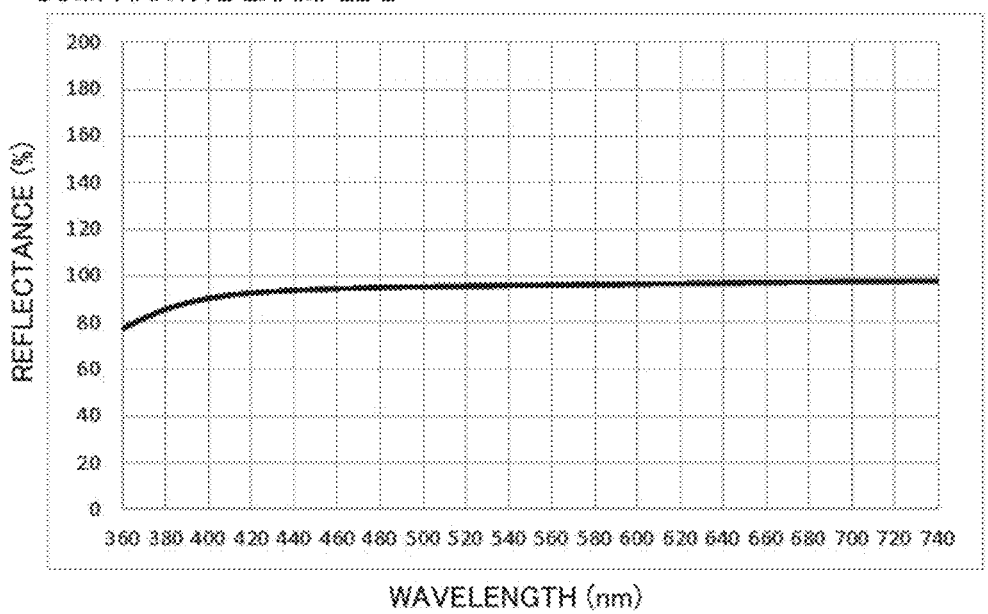
FIG. 7 is a reflectance spectral data of plate-like alumina particles obtained in Comparative Example 2.

FIG. 4 shows a reflectance spectral data of the plate-like alumina particles in Example 1. FIG. 5 shows a reflectance spectral data of the plate-like alumina particles in Example 3. FIG. 6 shows a reflectance spectral data of the plate-like alumina particles in Example 6. FIG. 7 shows a reflectance spectral data of plate-like alumina particles in Comparative Example 2.

In the plate-like alumina particle in Comparative Example 2 which did not contain a coloring component, a spectrum close to total reflection was observed in the measured range of 360 nm to 740 nm, a clear peak was not observed, and the color (visual observation) was light gray.

Meanwhile, in the plate-like alumina particles in Examples 1 to 6 which contained a coloring component, reflection of a specific wavelength was observed in the light reflection spectrum, a peak of reflectance was observed, the colors (visual observation) were respectively red, pink, blue, and green as shown in Table 2, and aesthetic appearance was excellent.

The plate-like alumina particles obtained in Examples 1 to 6 were subjected to the XPS measurement and the XRF measurement. As a result, it was determined that various components derived from the raw materials were contained.

In addition, in the alumina particles obtained in Examples 1 to 6, the molybdenum content was appropriately reduced by being manufactured through the second calcination step, and when the alumina particle in Example 1 was compared with the alumina particle in Comparative Example 1, the alumina particle in Example 1 showed a brighter red color.

In the plate-like alumina particles in Examples 1 to 6, the plate-like alumina crystals were single crystals, had large crystallite diameters, contained hexagonal-plate-like particles in addition to being substantially a-type. Therefore, it was ascertained that intense reflection of glittering light derived from the powder was observed and the color development and the brilliance were very excellent.

Each configuration of each of the embodiments or a combination or the like of the configurations is an example, and addition, omission, substitution, and other changes of the configuration may be performed within the bounds of not departing from the gist of the present invention. The present invention is not limited to each embodiment and is only defined by the scope of the claims.

The invention claimed is:

1. A plate-like alumina particle comprising:
molybdenum;
silicon; and
a coloring component comprising at least one transition metal element belonging to period 4 of the periodic table and being present in the alumina particle by partially substituting for aluminum in a crystal structure of alumina.

2. The plate-like alumina particle according to claim 1, wherein the coloring component is at least one selected from a group consisting of chromium, iron, titanium, nickel, vanadium, and cobalt.

3. The plate-like alumina particle according to claim 1, which is a single crystal.

4. The plate-like alumina particle according to claim 1, wherein the coloring component is at least one transition metal belonging to period 4.

5. The plate-like alumina particle according to claim 4, wherein the plate-like alumina particle has at least one reflectance peak in a light reflection spectrum within a range of 360 to 740 nm.

6. The plate-like alumina particle according to claim 4 wherein an average crystallite diameter of a (104) face is 150 nm or more, the average crystallite diameter being calculated from a full-width at half-maximum of a peak corresponding to a (104) face of diffraction peaks obtained based on XRD analysis.

7. The plate-like alumina particle according to claim 4, wherein an average crystallite diameter of a (113) face is 200 nm or more, the average crystallite diameter being calculated from a full-width at half-maximum of a peak corresponding to a (113) face of diffraction peaks obtained based on XRD analysis.

8. The plate-like alumina particle according to claim 1, wherein the plate-like alumina particle has at least one reflectance peak in a light reflection spectrum within a range of 360 to 740 nm.

9. The plate-like alumina particle according to claim 8 wherein an average crystallite diameter of a (104) face is 150 nm or more, the average crystallite diameter being calculated from a full-width at half-maximum of a peak corresponding to a (104) face of diffraction peaks obtained based on XRD analysis.

10. The plate-like alumina particle according to claim 8, wherein an average crystallite diameter of a (113) face is 200 nm or more, the average crystallite diameter being calculated from a full-width at half-maximum of a peak corresponding to a (113) face of diffraction peaks obtained based on XRD analysis.

11. The plate-like alumina particle according to claim 8, which is a single crystal.

12. The plate-like alumina particle according to claim 1, wherein an average crystallite diameter of a (104) face is 150 nm or more, the average crystallite diameter being calculated from a full-width at half-maximum of a peak corresponding to a (104) face of diffraction peaks obtained based on XRD analysis.

13. The plate-like alumina particle according to claim 12, wherein an average crystallite diameter of a (113) face is 200 nm or more, the average crystallite diameter being calculated from a full-width at half-maximum of a peak corresponding to a (113) face of diffraction peaks obtained based on XRD analysis.

14. The plate-like alumina particle according to claim 12, which is a single crystal.

15. The plate-like alumina particle according to claim 1, wherein an average crystallite diameter of a (113) face is 200 nm or more, the average crystallite diameter being calculated from a full-width at half-maximum of a peak corresponding to a (113) face of diffraction peaks obtained based on XRD analysis.

16. The plate-like alumina particle according to claim 15, which is a single crystal.

17. A method for manufacturing the plate-like alumina particle according to claim 1, the method comprising the steps of mixing an aluminum compound containing an aluminum element, a molybdenum compound containing a molybdenum element, a potassium compound containing a potassium element, silicon or a silicon compound, and a coloring component so as to produce a mixture and firing the resulting mixture.

18. The method for manufacturing the plate-like alumina particle according to claim 17, the method comprising the steps of mixing the aluminum compound in an amount of 10% by mass or more in terms of $Al_2O_3$, the molybdenum compound in an amount of 20% by mass or more in terms of $MoO_3$, the potassium compound in an amount of 1% by mass or more in terms of $K_2O$, the silicon or silicon compound in an amount of less than 1% by mass in terms of $SiO_2$, and the coloring component in an amount such that a molar ratio of a coloring component element in the coloring component to the aluminum element in the aluminum compound (coloring component element/aluminum element) is 0.0001 to 0.1, wherein a total amount of raw materials is defined to be 100% by mass in terms of oxides, so as to produce a mixture and firing the resulting mixture.

19. The method for manufacturing the plate-like alumina particle according to claim 17, the method further comprising the steps of taking out a plate-like alumina particle from the mixture after firing and further firing the plate-like alumina particle.

20. The method for manufacturing the plate-like alumina particle according to claim 17, wherein the mixture further includes an yttrium compound containing an yttrium element.

* * * * *